(12) United States Patent
Mohammed et al.

(10) Patent No.: US 7,900,140 B2
(45) Date of Patent: Mar. 1, 2011

(54) MEDIA PROCESSING METHODS, SYSTEMS AND APPLICATION PROGRAM INTERFACES

(75) Inventors: Sohail Baig Mohammed, Redmond, WA (US); Kirt A. Debique, Seattle, WA (US); Geoffrey T. Dunbar, Kirkland, WA (US); Patrick N. Nelson, Seattle, WA (US); Rebecca C. Weiss, Menlo Park, CA (US); Sumedh N. Barde, Redmond, WA (US); Adil Sherwani, Seattle, WA (US); Robin C. B. Speed, Winchester (GB); Alexandre V. Grigorovitch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1894 days.

(21) Appl. No.: 10/730,735

(22) Filed: Dec. 8, 2003

(65) Prior Publication Data

US 2005/0204289 A1    Sep. 15, 2005

(51) Int. Cl.
*G06F 17/00* (2006.01)
(52) U.S. Cl. .............. 715/249; 715/202; 715/204; 709/228; 709/231; 719/310
(58) Field of Classification Search .............. 715/201, 715/202, 203, 204, 249; 719/310; 709/228, 709/231
See application file for complete search history.

(56) References Cited

U.S. PATENT DOCUMENTS

| | | | |
|---|---|---|---|
| 5,140,437 A | 8/1992 | Yonemitsu et al. | |
| 5,420,801 A | 5/1995 | Dockter et al. | |
| 5,528,281 A | 6/1996 | Grady et al. | |
| 5,539,886 A | 7/1996 | Aldred et al. | |

(Continued)

FOREIGN PATENT DOCUMENTS

EP    0784271 A2    7/1997

(Continued)

OTHER PUBLICATIONS

GStreamer Core Reference Manual, "GstEvent" Archived Apr. 29, 2003 http://www.gstreamer.net/docs/gstreamer/gstreamer-gstevent.html.*

(Continued)

*Primary Examiner* — Adam M Queler
(74) *Attorney, Agent, or Firm* — Lee & Hayes, PLLC

(57) ABSTRACT

Media processing methods, systems and application program interfaces (APIs) are described. In but one embodiment, a media engine component, also referred to as a media engine, provides a simple and unified way of rendering media from an origin to a destination of choice without requiring intimate knowledge about the underlying components, their connectivity and management. Clients of the media engine need not worry about how to render the particular media, but rather can simply focus on what media to render and where to render the media. In at least one embodiment, a media session is provided and is used by the media engine and provides a mechanism by which additional components are made transparent to the application and, in at least some embodiment, the media engine. In some embodiments, the media engine and media session provide a simple API for building, configuring, and manipulating a pipeline of components (e.g. media sources, transforms, and sinks) for media flow control between an origin and one or more destinations.

82 Claims, 4 Drawing Sheets

U.S. PATENT DOCUMENTS

| | | | |
|---|---|---|---|
| 5,546,584 A | 8/1996 | Lundin et al. | |
| 5,574,934 A | 11/1996 | Mirashrafi et al. | |
| 5,577,258 A | 11/1996 | Cruz et al. | |
| 5,604,843 A | 2/1997 | Shaw et al. | |
| 5,625,404 A | 4/1997 | Grady et al. | |
| 5,675,752 A | 10/1997 | Scott et al. | |
| 5,712,906 A | 1/1998 | Grady et al. | |
| 5,764,965 A | 6/1998 | Poimboeuf et al. | |
| 5,765,011 A | 6/1998 | Wilkinson et al. | |
| 5,786,814 A | 7/1998 | Moran et al. | |
| 5,802,283 A | 9/1998 | Grady et al. | |
| 5,815,689 A * | 9/1998 | Shaw et al. | 713/400 |
| 5,878,431 A | 3/1999 | Potterveld et al. | |
| 5,886,274 A | 3/1999 | Jungleib | |
| 5,887,139 A | 3/1999 | Madison, Jr. et al. | |
| 5,892,767 A | 4/1999 | Bell et al. | |
| 5,936,643 A | 8/1999 | Tindell et al. | |
| 5,987,628 A | 11/1999 | Von Bokern et al. | |
| 5,995,512 A | 11/1999 | Pogue, Jr. | |
| 5,996,015 A | 11/1999 | Day et al. | |
| 6,014,706 A | 1/2000 | Cannon et al. | |
| 6,038,625 A | 3/2000 | Ogino et al. | |
| 6,044,408 A | 3/2000 | Engstrom et al. | |
| 6,178,172 B1 | 1/2001 | Rochberger | |
| 6,185,612 B1 | 2/2001 | Jensen et al. | |
| 6,192,354 B1 | 2/2001 | Bigus et al. | |
| 6,209,041 B1 | 3/2001 | Shaw et al. | |
| 6,243,753 B1 | 6/2001 | Machin et al. | |
| 6,262,776 B1 | 7/2001 | Griffits | |
| 6,263,486 B1 | 7/2001 | Boezeman et al. | |
| 6,266,053 B1 | 7/2001 | French et al. | |
| 6,279,029 B1 | 8/2001 | Sampat et al. | |
| 6,308,216 B1 | 10/2001 | Goldszmidt et al. | |
| 6,317,131 B2 | 11/2001 | Basso et al. | |
| 6,321,252 B1 | 11/2001 | Bhola et al. | |
| 6,343,313 B1 | 1/2002 | Salesky et al. | |
| 6,347,079 B1 | 2/2002 | Stephens et al. | |
| 6,369,835 B1 | 4/2002 | Lin | |
| 6,385,201 B1 | 5/2002 | Iwata | |
| 6,389,467 B1 | 5/2002 | Eyal | |
| 6,430,526 B1 | 8/2002 | Toll | |
| 6,457,052 B1 | 9/2002 | Markowitz et al. | |
| 6,466,971 B1 | 10/2002 | Humpleman et al. | |
| 6,536,043 B1 | 3/2003 | Guedalia | |
| 6,539,163 B1 | 3/2003 | Sheasby et al. | |
| 6,546,426 B1 | 4/2003 | Post | |
| 6,549,932 B1 | 4/2003 | McNally et al. | |
| 6,581,102 B1 | 6/2003 | Amini et al. | |
| 6,594,699 B1 | 7/2003 | Sahai et al. | |
| 6,594,773 B1 * | 7/2003 | Lisitsa et al. | 713/600 |
| 6,618,752 B1 | 9/2003 | Moore et al. | |
| 6,625,643 B1 | 9/2003 | Colby et al. | |
| 6,658,477 B1 | 12/2003 | Lisitsa et al. | |
| 6,684,331 B1 | 1/2004 | Srivastava | |
| 6,687,664 B1 | 2/2004 | Sussman et al. | |
| 6,691,312 B1 | 2/2004 | Sen et al. | |
| 6,694,368 B1 | 2/2004 | An et al. | |
| 6,711,171 B1 | 3/2004 | Dobbins et al. | |
| 6,725,274 B1 | 4/2004 | Slik | |
| 6,725,279 B1 | 4/2004 | Richter et al. | |
| 6,757,735 B2 | 6/2004 | Apostolopulos et al. | |
| 6,760,721 B1 | 7/2004 | Chasen et al. | |
| 6,802,019 B1 | 10/2004 | Lauder | |
| 6,810,526 B1 | 10/2004 | Menard et al. | |
| 6,823,225 B1 | 11/2004 | Sass | |
| 6,920,181 B1 | 7/2005 | Porter | |
| 6,957,430 B2 | 10/2005 | Fant et al. | |
| 6,975,752 B2 | 12/2005 | Dixon et al. | |
| 7,024,483 B2 | 4/2006 | Dinker et al. | |
| 7,035,858 B2 | 4/2006 | Dinker et al. | |
| 7,047,554 B1 | 5/2006 | Lortz | |
| 7,076,564 B2 | 7/2006 | To et al. | |
| 7,124,424 B2 | 10/2006 | Gordon et al. | |
| 7,139,925 B2 | 11/2006 | Dinker et al. | |
| 7,197,535 B2 | 3/2007 | Salesky et al. | |
| 7,206,854 B2 | 4/2007 | Kauffman et al. | |
| 7,240,325 B2 | 7/2007 | Keller | |
| 7,246,318 B2 | 7/2007 | Debique et al. | |
| 7,290,057 B2 | 10/2007 | Saunders et al. | |
| 7,299,485 B2 | 11/2007 | Chaney et al. | |
| 7,330,542 B2 | 2/2008 | Kauhanen et al. | |
| 7,415,537 B1 | 8/2008 | Maes | |
| 7,426,637 B2 | 9/2008 | Risan et al. | |
| 2001/0000962 A1 | 5/2001 | Rajan | |
| 2001/0024455 A1 | 9/2001 | Thaler et al. | |
| 2002/0051017 A1 | 5/2002 | Wishoff | |
| 2002/0085581 A1 | 7/2002 | Hauck et al. | |
| 2002/0099842 A1 | 7/2002 | Jennings | |
| 2002/0123997 A1 | 9/2002 | Loy et al. | |
| 2002/0158897 A1 | 10/2002 | Besaw et al. | |
| 2002/0174425 A1 * | 11/2002 | Markel et al. | 725/13 |
| 2002/0199031 A1 | 12/2002 | Rust et al. | |
| 2003/0028643 A1 | 2/2003 | Jabri | |
| 2003/0033424 A1 | 2/2003 | Gould | |
| 2003/0056029 A1 | 3/2003 | Huang et al. | |
| 2003/0093568 A1 | 5/2003 | Deshpande | |
| 2003/0095504 A1 | 5/2003 | Ogier | |
| 2003/0101253 A1 | 5/2003 | Saito et al. | |
| 2003/0123659 A1 | 7/2003 | Forstrom et al. | |
| 2003/0146915 A1 | 8/2003 | Brook et al. | |
| 2003/0149772 A1 | 8/2003 | Hsu et al. | |
| 2003/0158957 A1 | 8/2003 | Abdolsalehi | |
| 2003/0167356 A1 | 9/2003 | Smith et al. | |
| 2003/0177292 A1 | 9/2003 | Smirnov et al. | |
| 2003/0215214 A1 | 11/2003 | Ma | |
| 2003/0231867 A1 | 12/2003 | Gates et al. | |
| 2003/0236892 A1 | 12/2003 | Coulombe | |
| 2003/0236906 A1 | 12/2003 | Klemets et al. | |
| 2004/0001106 A1 | 1/2004 | Deutscher et al. | |
| 2004/0004631 A1 | 1/2004 | Debique et al. | |
| 2004/0031058 A1 | 2/2004 | Reisman | |
| 2004/0042413 A1 | 3/2004 | Kawamura et al. | |
| 2004/0073596 A1 | 4/2004 | Kloninger et al. | |
| 2004/0073912 A1 | 4/2004 | Meza | |
| 2004/0080504 A1 | 4/2004 | Salesky et al. | |
| 2004/0139157 A1 | 7/2004 | Neely, III et al. | |
| 2004/0177162 A1 | 9/2004 | Wetzel et al. | |
| 2004/0207723 A1 | 10/2004 | Davis et al. | |
| 2004/0208132 A1 | 10/2004 | Neulist et al. | |
| 2004/0220926 A1 | 11/2004 | Lamkin et al. | |
| 2004/0230659 A1 * | 11/2004 | Chase | 709/206 |
| 2004/0236945 A1 | 11/2004 | Risan et al. | |
| 2004/0267778 A1 | 12/2004 | Rudolph et al. | |
| 2004/0267899 A1 | 12/2004 | Rahman et al. | |
| 2004/0267953 A1 | 12/2004 | Dunbar et al. | |
| 2004/0268224 A1 | 12/2004 | Balkus et al. | |
| 2004/0268357 A1 | 12/2004 | Joy et al. | |
| 2004/0268407 A1 | 12/2004 | Sparrell et al. | |
| 2005/0005025 A1 | 1/2005 | Harville et al. | |
| 2005/0018775 A1 | 1/2005 | Subramanian et al. | |
| 2005/0055517 A1 | 3/2005 | Olds et al. | |
| 2005/0066082 A1 | 3/2005 | Forin et al. | |
| 2005/0081158 A1 | 4/2005 | Hwang | |
| 2005/0125734 A1 | 6/2005 | Mohammed et al. | |
| 2005/0132168 A1 | 6/2005 | Weiss et al. | |
| 2005/0172309 A1 | 8/2005 | Risan | |
| 2005/0188311 A1 | 8/2005 | Diesel et al. | |
| 2005/0198189 A1 | 9/2005 | Robinson et al. | |
| 2005/0204289 A1 | 9/2005 | Mohammed et al. | |
| 2005/0226324 A1 | 10/2005 | Ouyang et al. | |
| 2005/0262254 A1 | 11/2005 | Sherwani | |
| 2007/0011321 A1 | 1/2007 | Huntington et al. | |
| 2008/0037957 A1 | 2/2008 | Nallur et al. | |

2008/0154407 A1  6/2008  Carson

FOREIGN PATENT DOCUMENTS

| EP | 0814403 A1 | 12/1997 |
| JP | 2002514797 | 5/2002 |
| WO | WO9621189 A1 | 7/1996 |
| WO | WO9957837 A2 | 11/1999 |

OTHER PUBLICATIONS

Taymans,Wim, Steve Baker and Andy Wingo, GStreamer Application Development Manual, Archived Apr. 5, 2003 http://www.gstreamer.net/docs/gstreamer-manual.pdf.*

"IFileSourceFilter Interface", MSDN, Jul. 13, 2009, http://msdn.microsoft.com/en-us/library/dd389981(VS.85,printer).aspx.*

"EvCode.h", (C) 2001, http://www.lelandnsmith.com/downloads/Microsoft/DirectX%209%20SDK/sdk/Include/evcode.h.*

Thompson, Chris, "DirectShow for Media Playback in Windows" Parts 1-3, Last part dated Sep. 13, 2000, http://www.flipcode.com/archives/DirectShow_For_Media_Playback_In_Windows-Part_I_Basics.shtml.*

Blome, Michael and Mike Wasson, "Core Media Technology in Windows XP Empowers You to Create Custom Audio/Video Processing Components" MSDN Magazine, Jul. 2002 http://msdn.microsoft.com/en-us/magazine/cc301631.aspx.*

"DirectShow", Archived Oct. 17, 2002, http://www.gdcl.co.uk/dshow.htm.*

Kalman, Mark, "Analysis of Adaptive Media Playout for Stochastic Channel Models", Introduction, Mar. 13, 2001 http://www.stanford.edu/class/ee368c/Projects/project10/node1.html.*

Perry, Greg, Absolute Beginner's Guide to Programming, Second Edition, Apr. 10, 2001, Que, Chapter 14 http://proquest.safaribooksonline.com/0789725290/ch14lev1sec4.*

Manrique, Daniel, "X Window System Architecture Overview HOWTO" May 22, 2001 http://tldp.org/HOWTO/XWindow-Overview-HOWTO/.*

Dunn, et al., "The Design and Implementaion of JaDiSM", Nov. 13, 2007, pp. 38.

Barth, et al., "Configuring Distributed Multimedia Applications Using CINEMA", retrieved on Jan. 19, 2008 at <<http:// ieeexplore.ieee.org/xpls/absprintf.jsp?arnumber=557748>> Published 2006, pp. 10.

Notice of Rejection from the Japan Patent Office for Japanese Patent Application No. 2005-507640, mailed on Jan. 27, 2009, 13 pgs.

Agarwal, et al., "The Totem Multiple-Ring Ordering and Topology Maintenance Protocol", ACM, vol. 16, No. 2, 1998, pp. 93-132.

Bao, et al., "Topology Management in Ad Hoc Networks", ACM, 2003, pp. 129-140.

Jaffe, et al., "Automatic Update of Replicated Topology Data Base", ACM, 1984, pp. 142-148.

Sullivan, et al., "Programming with the Java Media Framework", Sean C. Sullivan, Loren Winzeler, Jeanine Deagen, and Deanna Brown, 1998, pp. 99.

Chatterjee, et al., "Microsoft DirectShow: A New Media Architecture", SMPTE Journal, 1997, pp. 865-871.

Cline, et al., "DirectShow RTP Support for Adaptivity in Networked Multimedia Applications", IEEE, 1998, pp. 13-22.

Escobar et al., "Flow Synchronization Protocol", IEEE/ACM Transactions on Networking, vol. 2, No. 2, Apr. 1994, pp. 111-121.

Timothy K. Shih, "Participator Depenent Multimedia Presentation", Journal of Information Sciences, vol. 107, pp. 85-105, 1998.

Timothy K. Shih and Wen C. Pai, "A Stepwise Refinement Approach to Multimedia Presentation Designs", IEEE, pp. 117-122, 1997.

Arbab Ali Samejo et al., "Graphical User Interface Based Multimedia Web Suite in Windows Evironment", Mehran Unversity Research Journal of Engineering & Technology, vol. 20, No. 2, pp. 57-68, Apr. 2001.

Timothy Shih, et al., "A Knowledge Abstraction Approach for Multimedia Presentation", IEEE, pp. 528-532, 1997.

Sei-Hoon Lee and Chang-Jong Wang, "Open Multimedia/Hypermedia Application Development Environment", Inspec, 1996.

Chi-Ming Chung, et al., "A Control and Data Abstraction Approach for Multimedia Presentation", Journal of the Chinese Institute of Electrical Engineering, vol. 5, No. 3, pp. 265-276, 1998.

Robertson, Mark A.; Stevenson, Robert L.; "Temporal Resolution Enhancement in Compressed Video Sequences"; University of Notre Dame, Notre Dame, Indiana; Sep. 2001; pp. 1-11.

Girod, Bernd; Farber, Niko; "Feedback-Based Error control for Mobile Video Transmission"; Proceedings of the IEEE, v 87, n10, Oct. 1999; pp. 1707-1723.

Chien, Shao-Yi; Chen, Ching-Yeh; Huang, Yu-Wen; and Chen, Liang-Gee; "Multiple Sprites and Frame Skipping Techniques for Sprite Generation with High Subjective Quality and Fast Speed"; IEEE 2002; pp. 785-788.

Olson, Robert, et al., "Remote Rendering Using Vtk and Vic," website at http://www-unix.mcs.anl.gov/fl/publications/vis00-vicvtk.pdf, 2 pages, 2000.

Engel, Klaus et al, "Remote 3D Visualization Using Image-Streaming Techniques" website at: http://citeseer.nj.nec.com/394248.html, 4 pages, 1999.

Engel, K., et al., "Combining Local and Remote Visualization Techniques for Interactive Volume Rendering in Medical Applications" website at http://wwwvis.informatik.uni-stuttgart.de/eng/research/pub/pub2000/engel_vis00.pdf, 2000.

TGS website at http://www.tgs.com/pro_div/oiv_overview.htm, Open Inventor from TGS4.0 "Open Inventor Overview," printed Apr. 28, 2003, 4 pages.

* cited by examiner

MEDIA PROCESSING METHODS, SYSTEMS AND APPLICATION PROGRAM INTERFACES

TECHNICAL FIELD

This invention relates to media processing methods, systems and application program interfaces.

BACKGROUND

As multimedia systems and architectures evolve, there is a continuing need for systems and architectures that are flexible in terms of implementation and the various environments in which such systems and architectures can be employed. As an example, consider the following as flexibility is viewed from the vantage point of software applications that execute in conjunction with such multimedia systems.

When it comes to rendering multimedia presentations, some software applications are very basic in terms of their functionality. That is, these basic types of applications might simply wish to provide a multimedia system with only a small amount of data that pertains to the presentation and have the multimedia system itself do the remainder of the work to render the presentation. Yet other more complex types of application may wish to be more intimately involved with the detailed processing that takes place within the multimedia system.

Against this backdrop, there is a continuing need to provide multimedia systems and architectures that meet the needs of applications that are distributed along a spectrum of simple applications to complex applications.

SUMMARY

Media processing methods, systems and application program interfaces (APIs) are described. In but one embodiment, a media engine component, also referred to as a media engine, provides a simple and unified way of rendering media from an origin to a destination of choice without requiring intimate knowledge about the underlying components, their connectivity and management. Clients of the media engine need not worry about how to render the particular media, but rather can simply focus on what media to render and where to render the media. In at least one embodiment, a media session is provided and is used by the media engine and provides a mechanism by which additional components are made transparent to the application and, in at least some embodiment, the media engine.

In some embodiments, the media engine and media session provide a simple API for building, configuring, and manipulating a pipeline of components (e.g. media sources, transforms, and sinks) for media flow control between an origin and one or more destinations.

DETAILED DESCRIPTION

Overview

Figure 1:
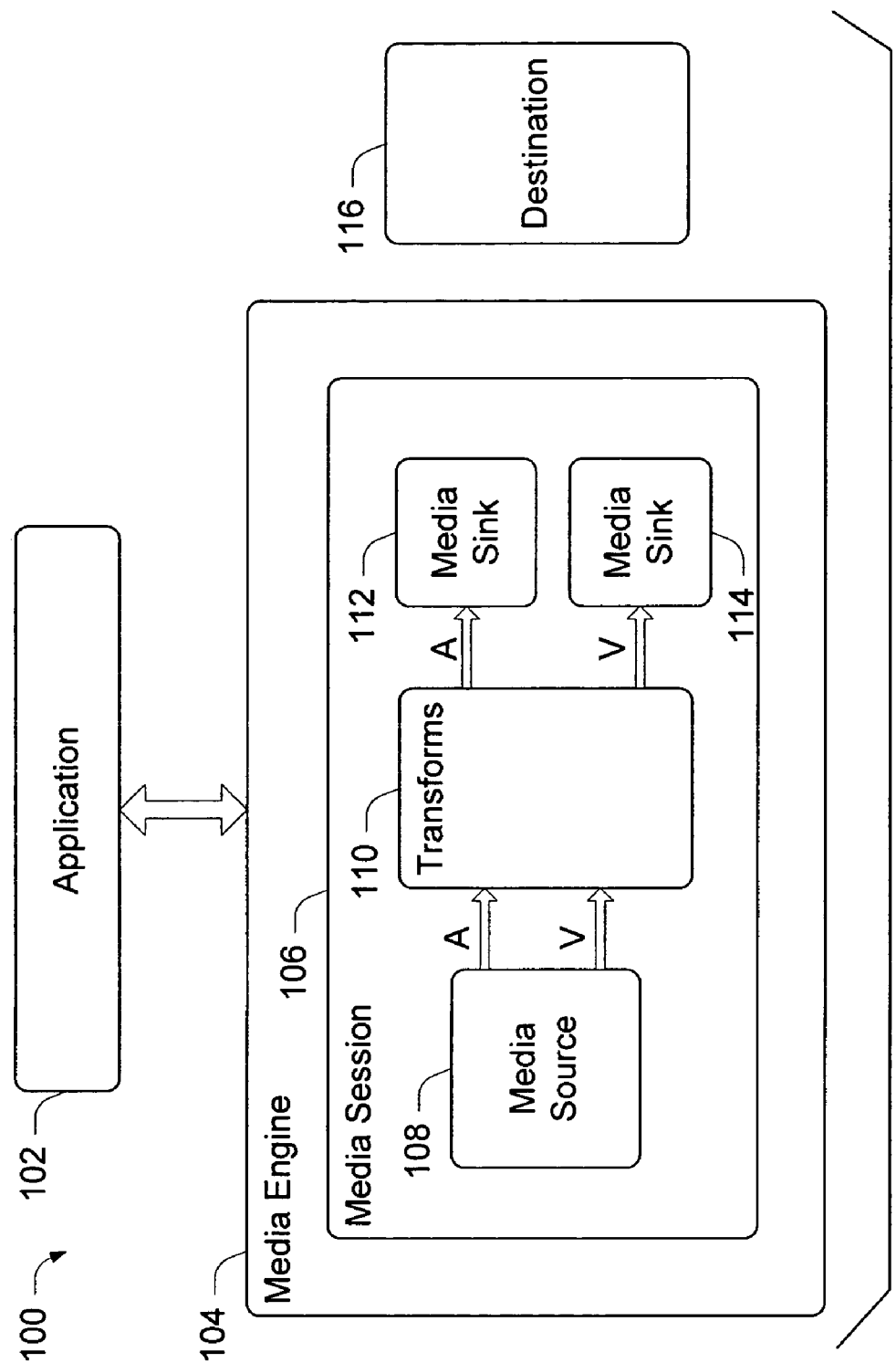
FIG. 1 is a block diagram of a system in accordance with one embodiment.

FIG. 1 illustrates a high level block diagram of an exemplary system in accordance with one embodiment, generally at 100. In one or more embodiments, system 100 is implemented in software. In system 100, an application 102 interacts with a media engine component or more simply a media engine 104. In at least some embodiments, media engine 104 serves as a central focal point of an application that desires to somehow participate in a presentation. A presentation, as used in this document, refers to or describes the handling of media content. In the illustrated and described embodiment, a presentation is used to describe the format of the data that the media engine is to perform an operation on. Thus, a presentation can result in visually and/or audibly presenting media content, such as a multimedia presentation in which both audio and accompanying video is presented to user via a window executing on a display device such as a display associated with a desk top device. A presentation can also result in writing media content to a computer-readable medium such as a disk file. Thus, a presentation is not simply limited to scenarios in which multimedia content is rendered on a computing device. In some embodiments, operations such as decoding, encoding and various transforms (such as transitions, effects and the like), can take place as a result of the presentation.

In one embodiment, media engine 104 exposes particular application program interfaces that can be called by application 102. One implementation of application program interfaces that are exposed by media engine 104 is described in the section entitled "Application Program Interfaces" below.

In accordance with the illustrated and described embodiment, the media engine 104 can use several components among which include a media session 106, one or more media sources 108, one or more transforms 110 and one or more media sinks 112, 114. One advantage of various illustrated and described embodiments is that the described system is a pluggable model in the sense that a variety of different kinds of components can be utilized in connection with the systems described herein. Also comprising a part of system 100 is a destination 116, which is discussed in more detail below. In at least one embodiment, however, a destination is an object that defines where a presentation is to be presented (e.g. a window, disk file, and the like) and what happens to the presentation. That is, a destination can provide sink objects into which data flows.

In at least one embodiment, media session 106 can use media sources, transforms and media sinks. One reason for providing a media session 106 is to abstract away the specific details of the existence of and interactions between media sources, transforms and media sinks from the media engine 104 and the application 102. That is, in some embodiments, the components that are seen to reside inside the media session 106 are not visible, in a programmatic sense, to the media engine 104. This permits the media engine 104 to execute so-called "black box" sessions. That is, the media engine 104 can interact with the media session 106 by providing the media session certain data, such as information associated with the media content (e.g. a URL) and a destination 116, and can forward an application's commands (e.g. open, start, stop and the like) to the media session. The media session 106 then takes the provided information and creates an appropriate presentation using the appropriate destination.

A media source 108 comprises a component that knows how to read a particular type of media content from a particular source. For example, one type of media source might capture video from the outside world (a camera), and another might capture audio (a microphone). Alternately or additionally, a media source might read a compressed data stream from disk and separate the data stream into its compressed video and compressed audio component. Yet another media source might get such data from the network.

Transforms 110 can comprise any suitable data handling components that are typically used in presentations. Such components can include those that uncompress compressed data and/or operate on data in some way, such as by imparting an effect to the data, as will be appreciated by the skilled artisan. For example, for video data, transforms can include those that affect brightness, color conversion, and resizing. For audio data, transforms can include those that affect reverberation and resampling. Additionally, decoding and encoding can be considered as transforms.

Media sinks 112 and 114 are typically associated with a particular type of media content. Thus, audio content might have an associated audio sink such as an audio renderer. Likewise, video content might have an associated video sink such as a video renderer. Additional media sinks can send data to such things as computer-readable media, e.g. a disk file and the like.

In one embodiment, the media engine 104 provides various functionalities that can be utilized directly or indirectly by application 102. For example, media engine 104 can provide support for linear or simple (e.g. asf, mp3, etc.) and non-linear or composite (e.g. AAF, ASX, M3U, etc.) media sources. Alternately or additionally, the media engine 104 can provide transport control for media content (e.g. play; pause, stop, rewind, forward, rate, scrubbing). Alternately or additionally, the media engine 104 can provide asynchronous building and management of a media pipeline given a source of media content. Alternately or additionally, the media engine 104 can provide for automatic resolution of media sources given a URL. Alternately or additionally, the media engine 104 can provide for automatic resolution of decoders, encoders, color converters, etc. to fully specify the connections between a source and a sink (e.g. format negotiation). Alternately or additionally, the media engine 104 can provide access to individual components in the media pipeline for configuration. Alternately or additionally, the media engine 104 can provide support for applying transformations, e.g. effects such as equalization, brightness control, and the like to media streams. Alternately or additionally, the media engine 104 can provide for quality of service notifications that enable clients to adjust pipeline configuration in order to achieve desired performance and user experience. Alternately or additionally, the media engine 104 can provide a service provider model to enable support for controlling media pipelines that cannot be factored into sources, transforms, and sinks. For example, a client of the media engine 104 can be able to control the flow of media samples in a distributed scenario across machine boundaries. Alternately or additionally, the media engine 104 can provide for synchronization of audio/video and other streams. Alternately or additionally, the media engine 104 can make provisions for processing metadata associated with particular media content. Such will become more apparent as the description below is read.

Stream Selection

Stream selection, as used in this document, refers to the process whereby the media engine 104 chooses which media streams, from the underlying media source to process data from. In the embodiment described in this document, the media engine 104 supports multiple different modes of stream selection.

The first mode is referred to as automatic stream selection, in which the media engine 104 is responsible for selecting which streams are used. Automatic stream selection is the default stream selection mode. A second mode is referred to as manual stream selection, in which the application has control over exactly which streams are used. A stream selector service, which is exposed by the media engine, can be used to control advanced stream selection functionality.

Automatic Stream Selection

In the illustrated and described embodiment, the default stream selection mode for the media engine is automatic stream selection in which the media engine selects the stream to use (with the assistance of the media source). The stream selection criteria, expressed as a property store, are passed to the media engine as part of the configuration parameters to the openXXX methods described below. The default, expressed by not putting any stream selection criteria into the configuration property store, will cause the media engine 104 to simply make the default selection of streams. The stream selection criteria are specified in the property store passed into the media engine 104 as part of the openXXX methods. The criteria can be changed on the fly using the stream selector service, using the IMFStreamSelector::SetAutomaticStreamSelectionCriteria method, which is described in more detail in the section entitled "Application Program Interfaces" below.

With respect to interleaved streams, consider the following. If the stream selection criteria allow the type MFMediaType_Interleaved, then any interleaved streams will be selected and exposed to the destination. In the case where the MFMediaType_Interleaved is not selected by the criteria, the media engine will automatically insert a demultiplexer for any interleaved streams, and then perform stream selection on the demultiplexed streams as per the stream selection criteria.

Manual Stream Selection

Manual stream selection occurs when the application takes complete control of the stream selection process. Generally, this implies that the application has some specific knowledge of the media source in use, and can determine the relationships between streams through some source-specific knowledge.

Manual stream selection is enabled through the stream selector service by using the IMFStreamSelector::SetManualStreamSelection method (described below) to enable it. Note that, in one embodiment, manual stream selection can only be enabled or disabled while the media engine 104 is in the stOpened or stInitial states (i.e. basically, when the media engine is not running).

To implement manual stream selection, the application should set itself as a delegate for the MENewPresentation event. During processing of this event the application should configure the presentation descriptor (the value of the MENewPresentation event) with the desired stream selection. The media engine will inspect this presentation for the desired stream selection when the event delegate completes.

Opening and Closing Media Content

In at least one embodiment, media engine 104 provides a variety of "open" methods or calls that can be utilized by an application to specify a data source in a variety of manners, and a destination for the data. The various open calls provide different mechanisms for specifying the source of the data. In this embodiment, media engine 104 is designed to be the common media control interface for the application. Calling an open method results in the media engine building a data flow pipeline for processing the data. This process can involve a negotiation between data source, stream selection criteria, and the destination. Once this process is complete and the pipeline is fully configured, an event can be sent to the application. In the implementation example given below, this event is referred to as the MEMediaOpened event. This and other events are more fully described in a section entitled "Events" below.

In one embodiment, media engine 104 exposes application program interfaces for supporting one or more functionalities described just below. For a specific implementation example, the reader is referred to the section entitled "Application Program Interfaces" below.

A first functionality that can be provided by the media engine's APIs is a functionality that causes the media engine 104 to use a source resolver to create a media source that is able to read the media content at a specified URL. In the implementation example given below, an exemplary method IMFMediaEngine::OpenURL( ) is described.

A second functionality that can be provided by the media engine's APIs is a functionality as follows. If an application has already created a media source and would like the presentation to use that media source, the application can call a method that causes the media engine 104 to use the source that the application has created. In the implementation example given below, an exemplary method IMFMediaEngine::OpenSource( ) is described. In this particular instance, an application can be more involved in the presentation process insofar as being able to create and utilize its own media source.

A third functionality that can be provided by the media engine's APIs is a functionality that can be utilized by applications that do not have a media source, but instead have an object that implements an interface from which a media source object can be obtained. In the implementation example given below, an exemplary method IMFMediaEngine::OpenActivate( ) is described.

A fourth functionality that can be provided by the media engine's APIs is a functionality for applications that have an object from which sequential data can be obtained. In the implementation example described below, an exemplary method IMFMediaEngine::OpenByteStream( ) is described.

A fifth functionality that can be provided by the media engine's APIs is a functionality that can be utilized by advanced or complex applications. Specifically, some advanced applications may wish to create a partial topology defining the sources, sinks, and transforms to be used in the presentation, instead of relying on the media engine and media session to do it. In the illustrated and described embodiment, these applications can supply the partial topology and can by-pass any source-resolution that would otherwise be done. In the implementation example described below, an exemplary method IMFMediaEngine::OpenTopology( ) is described.

A sixth functionality that can be provided by the media engine's APIs is a functionality that closes the current media content. The media engine 104 can subsequently be reused for new media by using any of the above "Open" calls. In the implementation example described below, an exemplary method IMFMediaEngine:Close( ) method is described.

Media Engine Presentation Control

In accordance with one embodiment, media engine 104 provides functionality for a number of different presentation control features among which include functionalities that start a presentation, stop a presentation, pause a presentation, and start at a certain time, each of which is described under its own heading below.

Start

In accordance with one embodiment, a start method is provided and can be called by an application to start a presentation. The start method utilizes different parameters to facilitate starting a presentation. In accordance with one embodiment, the start method provides an asynchronous way to start processing media samples. This operation gets the media samples moving through the pipeline and delivered to the appropriate sinks. A Startoffset parameter specifies a media location at which to start processing. A Duration parameter specifies the length of media that is to be processed beginning at the StartOffset. In some embodiments, instead of a Duration parameter, an EndOffset parameter can be used to specify a media location at which to end processing. In the event that these parameters are not used, default parameters are utilized that request a presentation to start at the beginning of the data and play until the end of the data. An event (described below as a MEMediaStarted event) can also be generated and sent to the application to mark the completion of this asynchronous operation. The start method can also be called while the media engine 104 is in the course of a presentation. In this case, the start method seeks to a new location in the media content and starts the presentation from the new location. An exemplary start method IMFMediaEngine::Start( ) is described below.

Stop

In accordance with one embodiment, a stop method is provided and can be called by an application to stop the presentation. The stop method provides an asynchronous way to stop media sample processing in the media engine. Responsive to calling the stop method, an event can be generated and sent to the application to notify the application of the completion of this operation. An exemplary stop method IMFMediaEngine::Stop( ) is described below.

Pause

In accordance with one embodiment, a pause method is provided and can be called by an application to pause the presentation. The pause method provides an asynchronous way to stop media processing in the media engine. Responsive to calling the pause method, an event can be generated and sent to the application to notify the application of the completion of this operation.

Start at a Certain Time

In accordance with one embodiment, a start at time method is provided and can be called by an application to start a presentation at a specified time. Specifically, this method causes the media engine 104 to start a presentation at a certain time. The "start at time" parameter is given with respect to an external clock. By default, the external clock is the system clock; however, the external clock may also be an external clock that is provided by the application.

Information Querying About the Presentation

In accordance with one embodiment, a set of APIs are provided that enable applications to obtain information that pertains to the presentation, the media engine 104, and the media session 106. As an example, consider the following non-exclusive methods that can be called by the application.

GetCapabilities

In one embodiment, a method is provided that enables the application to be exposed to various capabilities of the media engine and media session. Some of the capabilities that the application can ascertain can be capabilities that can change during the course of a presentation. As an example, various capabilities can include, without limitation, "can start", "can skip forward", "can skip backward", "can skip TL node", "can seek", and "can pause". An example method IMFMediaEngine::GetCapabilities is described below.

GetMetadata

In one embodiment, a method is provided that enables the application to obtain a property store which can be queried for various metadata associated with or concerning the presentation. Examples of such metadata include, without limitation, duration, title, author and the like. An exemplary method IMFMediaEngine::GetMetadata( ) is described below.

GetDestination

In one embodiment, a method is provided that enables the application to ascertain the current destination. This method returns a pointer to the destination in use. An exemplary method IMFMediaEngine::GetDestination( ) is described below.

GetStatistics

In accordance with one embodiment, a method is provided that enables the application to ascertain statistics associated with a media engine. Using this method, an application can query statistics of the current configuration of the media engine. These statistics may be generated by the media engine, or may be aggregated from the underlying components (media sources, transforms, media sinks). An exemplary method IMFMediaEngine::GetStatistics( ) is described below.

GetState

In accordance with one embodiment, a method is provided that enables the application to ascertain the current state of the media engine (e.g. started, stopped, paused, etc.). An exemplary method IMFMediaEngine::GetState( ) is described below.

GetClock

In accordance with one embodiment, a method is provided that enables the application to retrieve the clock according to which the media engine is presenting. The application can use this information to monitor the progress of the presentation. Monitoring the progress of the presentation can enable the application to display a counter that indicates the current location of the presentation. An exemplary method IMFMediaEngine::GetClock( ) is described below.

ShutDown

In accordance with one embodiment, a method is provided that causes all resources that are used by the media engine to be properly shut down and released. The method also releases all references to other components (including media sessions), shutting them down as well. An exemplary method IMFMediaEngine::Shutdown( ) is described below.

Events

In accordance with one embodiment, the media engine 104 supports an interface for generating events that mark the completion of asynchronous methods invoked on the media engine. The media engine 104 can also notify the client (i.e. application) about unsolicited events that occur in the media pipeline through the same mechanism. For example, the media engine can generate events that indicate changes in the presentation and quality control notifications. In addition, it is to be appreciated and understood that events can also be generated by the media session 106 and/or components inside the media session for propagation to the application.

As a non-exclusive example of such events, consider the following discussion which highlights certain events under their own separate headings.

MENewPresentation

This event is accompanied by a presentation descriptor that describes how the presentation coming out of the media source(s) will look. As an example, in some embodiments, up until this time, the application does not know what type of content comprises the presentation, e.g. audio, video, multiple streams, and the like. The presentation descriptor allows the application to ascertain this information. In one embodiment, this event will be received once after one of the open calls described above is made, and once for every new presentation that the media source will output subsequently in timeline scenarios. Applications can optionally use this information to configure the destination in anticipation of this new presentation.

In one embodiment, the MENewPresentation event is fired at topology creation time, and indicates that a new presentation is being configured, for which a destination method entitled IMFDestination::GetOutputInfo method, will get called for every stream in the new presentation. The application may set itself as a delegate for this event on the media engine, in which case the destination is guaranteed to not get invoked until the delegate has finished processing the event and called the callback function.

With respect to the value of this event, consider the following. The value contains a pointer to an IMFPresentationDescriptor object, which will have stream descriptors for the output streams of the presentation, with partially-specified media types. These stream descriptors will be the same IMFStreamDescriptor pointers that will be sent to the GetOutputInfo calls on the destination. The metadata property store object of this presentation descriptor will have a pointer to the input presentation descriptor, saved under the property key MFPKEY_ENGINE_SourcePresentation, containing additional information about the input streams from the media source.

MEMediaOpened

The MEMediaOpened event indicates the completion of the opens asynchronous calls on the media engine 104. In some embodiments, when this event is fired, the first presentation for the media has been configured and fully loaded, and is ready to start. The media engine can accept start calls before this event is fired. In practice, however, the execution of the start calls will typically be delayed until the open has completed. In one embodiment, unless the open call failed, MEMediaOpened is guaranteed to be preceded by a MENewPresentation event, for configuring the presentation before it can be ready to start. With respect to the status of the event, the status is designated as "OK" if the open call succeeded, and a failure code if the open call failed. With respect to the value of this event, if the open call succeeded, the data object contains a pointer to an IMFPresentationDescriptor object, with fully-specified media types for the output streams of the presentation. This object will include any additional output streams that would have been created if the media engine received a collection of IMFOutputInfos from the destination for a particular output stream. The metadata property store object of this presentation descriptor will have a pointer to the input IMFPresentationDescriptor object, saved under the property key MFPKEY_ENGINE_SourcePresentation, containing additional information about the input streams from the media source. This input IMFPresentationDescriptor object will be the same one that was present in the property store of the data object for the corresponding MENewPresentation event.

MEMediaStarted

The MEMediaStarted event indicates the completion of the asynchronous operation begun by calling start on the media engine. With respect to the status of the event, the status is "OK" if the start call succeeded, and a failure code if the start call failed. With respect to the value of the event, if the start call succeeded, the data value propvariant contains the start time in 100 ns units.

MEMediaStopped

The MEMediaStopped event indicates the completion of the asynchronous operation begun by calling stop on the media engine. With respect to the status of the event, the status is "OK" if the stop call succeeded, and a failure code if the stop failed.

MEMediaPaused

The MEMediaPause event indicates the completion of the asynchronous operation begun by calling pause on the media engine. With respect to the status of the event, the status is "OK" if the pause call succeeded, and a failure code if the pause call failed.

MEMediaEnded

The MEMediaEnded event indicates that the last sample of data from the active media source has been rendered.

MEMediaClosed

The MEMediaClosed event indicates the completion of the asynchronous operation begun by calling close on the media engine. At this point, other open calls can be executed. With respect to the status of the event, the status is "OK" if the close call succeeded, and a failure code if the close failed.

MEPresentationSwitch

The MEPresentationSwitch event is fired when a switch is made from one presentation to the next, and indicates that the active running presentation has been replaced with a new presentation. In one embodiment, this event is fired when the next presentation is actually executed or played. Each MEPresentationSwitch event is guaranteed to be preceded by a corresponding MENewPresentation event, for configuring the presentation before it can be switched to.

With respect to the value of the event, the value contains a pointer to the presentation descriptor of the new presentation that has been switched to. This object is similar to that given out in the MEMediaOpened event, as it has fully-specified media types on the output nodes and contains a pointer to the source presentation descriptor in its metadata property store object, under the property key MFPKEY_ENGINE_SourcePresentation.

MEOutputsUpdated

The MEOutputsUpdated event indicates that the media engine has received a MEDestinationChanged event from the destination, and has reconfigured the current presentation to handle the changes from the destination. The MEOutputsUpdated event is not preceded by a MENewPresentation event, but every MEOutputsUpdated event corresponds to a MEDestinationChanged event that the Engine receives from the destination.

With respect to the value of this event, the data object contains a pointer to the presentation descriptor of the current presentation after being reconfigured with the destination changes. This object is similar to that given out in the MEMediaOpened and MEPresentationSwitch events, as it has fully-specified media types on the output nodes and contains a pointer to the source presentation descriptor in its metadata property store object, under the property key MFPKEY_ENGINE_SourcePresentation.

MEEngineStateChanged

The MEEngineStateChanged event indicates that the state of the media engine has changed. The "value" member of this event is an IMFMediaEngineState pointer, from which the application can get more information about the state. The IMFMediaEngineState interface is described further below. Note that because of the asynchronous nature of the various events, the engine state may have changed yet again by the time the application sees this event. This event (and its value) is useful when an application wants to know about every single state change in the order it occurs. On the other hand if the application only wants to know the latest state, then it should use the GetState( ) method instead to synchronously fetch the current state of the engine.

MECapabilitiesChanged

The MECapabilitiesChanged event is fired by the engine when the set of allowed operations on the engine changes. The media engine also bubbles this event up from underlying components. This event and its arguments are defined in more detail in the section titled "Engine Capabilities" below.

MEMediaRateChanged

When the application has changed the playback rate, this event is sent to indicate that playback is now happening at the new rate. The value is a floating-point number indicating the new rate. The status code indicates whether the rate change occurred successfully.

Engine Capabilities

In accordance with one embodiment, not all operations on the media engine are allowed at all times. For example, certain operations may be disabled when the media engine or components under it are in a state where that operation does not make sense, e.g. start will be disabled until open completes. Additionally, certain operations may also be disabled based on the media content, e.g. an ASX may allow skipping or seeking during certain clips.

Applications typically need to know what operations are available at any particular moment, both at the media engine level and on the other interfaces that the applications have access to. Applications also typically need to know when the set of allowed operations changes. One reason that applications need this information is so that the applications can enable or disable corresponding user interface (UI) features.

In the presently-described embodiment, these needs are satisfied by the GetCapabilities method on IMFMediaEngine and the MECapabilitiesChanged event.

IMFMediaEngine::GetCapabilities

This method returns a DWORD which is a bitwise OR of the following bits.

| Bit | Description |
| --- | --- |
| MFENGINECAP_START | This bit is set if the media engine currently allows Start( ) with a start time of PRESENTATION_CURRENT_POSITION. An application will typically enable the Play button based on this. |
| MFENGINECAP_SKIPFORWARD | This bit is set if the media engine currently allows Start( ) with a time format of GUID_ENTRY_RELATIVE and a positive time value. In the case of timeline sources this means skipping to the next node; for non-timeline sources this typically means skipping |

| Bit | Description |
| --- | --- |
| | to the next segment as defined by the source. An application will typically enable the SkipForward button based on this. |
| MFENGINECAP_SKIPBACKWARD | This bit is set if the media engine currently allows Start( ) with a time format of GUID_ENTRY_RELATIVE and a negative time value. An application will typically enable the SkipBackward button based on this. |
| MFENGINECAP_SKIPTLNODE | This bit is set if the media engine allows calling Start( ) with the GUID_TIMELINE_NODE_OFFSET time format. An application will typically enable its playlist UI based on this. |
| MFENGINECAP_SEEK | This bit is set if the engine allows calling Start( ) with any value other than the ones called out above. An application will typically enable its seek bar based on this. |
| MFENGINECAP_PAUSE | This bit is set if the engine allows calling Pause( ). An application will typically enable the Pause button based on this. |

As may be gleaned from the above table, each capability bit corresponds to a method on the media engine. If the bit is set then there is a good chance that method will succeed. However due to the dynamic nature of the engine, this cannot be guaranteed.

In one embodiment, there are no capability bits corresponding to Stop( ), Close( ), or Shutdown( ), as these operations are always allowed.

MECapabilitiesChanged

This event is fired when the set of allowed operations on the media engine changes. This event is also bubbled up by the engine from components underneath it. GetValue on this event returns a PROPVARIANT whose type is VT_UNKNOWN and punkVal member contains a pointer to IMFCapChange. This interface contains more information about what capabilities changed and on which component. The section just below describes this interface in detail. Preliminarily, the description below sets forth a way that enables capability changes from components underlying the media engine to be sent to the application. The approach described below alleviates a need for the media engine to wrap every single capability of every single underlying component.

IMFCapChange

```
interface IMFCapChange : IUnknown
{
    HRESULT GetOriginatorIID( [out] IID *piid );
    HRESULT GetOriginatorPointer( [out] IUnknown **ppunk );
    HRESULT GetNewCaps( [out] DWORD *pdwNewCaps );
    HRESULT GetCapsDelta( [out] DWORD *pdwCapsDelta );
}
```

IMFCapChange::GetOriginatorIID

GetOriginatorIID returns the IID for the interface whose capabilities changed. In the case of the media engine the only valid value is IID_IMFMediaEngine. In the case of components that expose multiple interfaces and/or services, the IID indicates how to interpret the bits obtained by GetNewCaps and GetCapsDelta.

Syntax
HRESULT GetOriginatorIID([out]IID*piid);
Parameters
piid
[out] IID of the interface whose capabilities changed.
Return Values
If the method succeeds, it returns S_OK. If it fails, it returns an error code.

IMFCapChange::GetOriginatorPointer

GetOriginatorPointer returns the pointer to the interface whose capabilities changed. If the IID returned by the previous method is IID_IMFMediaEngine then this pointer does not add much value. In the case of the rate control service however, the application can use this pointer to query more detailed information about the new rate capabilities using IMFRate-specific methods.

Syntax
HRESULT GetOriginatorPointer([out] IUnknown**punkOriginator);
Parameters
punkOriginator
[out] Pointer to the interface whose capabilities changed.
Return Values
If the method succeeds, it returns S_OK. If it fails, it returns an error code.

IMFCapChange::GetNewCaps

GetNewCaps returns a DWORD containing a bitwise OR of the new capabilities. An application must interpret these bits differently based on the IID returned by GetOriginatorIID. In many cases this DWORD may be good enough for the application to update its UI; in some cases (such as IMFRate) the application may need to get more information via the pointer returned by GetOriginatorPointer.

Syntax
HRESULT GetNewCaps([out] DWORD*pdwNewCaps);
Parameters
pdwNewCaps
[out] Bitwise OR of the new capabilities.
Return Values
If the method succeeds, it returns S_OK. If it fails, it returns an error code.

IMFCapChange::GetCapsDelta

GetCapsDelta returns a DWORD which is a bitwise OR of the capabilities that just changed. This lets the application optimize what it does on a cap change. In the case of simple boolean caps (e.g. can pause or cannot pause), this is just an XOR of the previous value and the new value. However for more complex caps this bit may be set even though the previous value of the caps and the new value both have the bit set. For example, in the case of rate, if the range of positive rates changes then both the previous bit and the new bit will be set yet the delta will also be set to 1.

Syntax
HRESULT GetCapsDelta([out] DWORD*pdwCapsDelta);
Parameters
pdwCapsDelta
[out] Bitwise OR of the capabilities that changed.

Return Values

If the method succeeds, it returns S_OK. If it fails, it returns an error code.

Media Session

As noted above, in the illustrated and described embodiment, a media session 106 is utilized to run a presentation. In the embodiments described above, the media session 106 is used by the media engine 104. One of the reasons for the existence of the media session is to allow third parties, also referred to as "providers," to plug into and utilize the infrastructure support provided by the media engine 104 without necessarily factoring their design into such components as media sources, media sinks, and transforms. This enables system 100 in FIG. 1 to be utilized to implement so-called "black box" sessions in which the application and media engine need not necessarily be familiar with or knowledgeable of the specific components that reside inside of the media session.

In one embodiment, the media session 106 enables the media engine 104 to control the data flow between a variety of sources and sinks through a single interface. In the example described below in the section entitled "Media Session Application Program Interfaces", this interface is referred to as the IMFMediaSession interface.

In at least one embodiment, a media session 106 manages dataflow from the media source to one or more sinks. This can and typically does include the transformation and synchronization of media content. The media engine 104 has the responsibility of selecting the appropriate session type based on the sources/sinks. For example, some scenarios that can require different types of media sessions include, without limitation, (1) local machine playback/encode (Media Processing Session), (2) distributed playback (Distributed Media Session), (3) macromedia flash playback (Flash Media Session), and (4) a protected media path session. A protected media path session is provided for presenting protected (e.g. rights-management) content. In one embodiment, the session can reside in a separate process from the application. In another embodiment, the session can reside in the same process as the application and can create a separate protected media path process where the media samples get decoded and processed.

Media Session Configuration

In accordance with one embodiment, APIs are provided that enable the media engine 104 to configure the media session 106 for a presentation.

A first method, referred to as SetTopology, provides an asynchronous way of initializing a full topology on the media session. The media engine 104 calls this method once it has a full topology for the upcoming presentation. In one embodiment, the media session 106 sets this on a component known as the media processor (described in more detail below), which sets up the pipeline to get data from the media source through all of the transforms specified in the topology. An exemplary method IMFMediaSession::SetTopology( ) is described below. In some embodiments, the SetTopology( ) method can be combined with a ResolveTopology( ) method so that the method can take a partial topology and resolve it internally.

A second method, referred to as SetPresentationClock, provides a way for the media session to ensure that all components (e.g. media sinks and some media sources) subscribe to receive notifications from the same clock which is used to control the presentation. An exemplary method IMFMediaSession::SetPresentationClock( ) is described below.

A third method, referred to as SetConfigurationPropertyStore, provides an extensible set of configuration parameters that can be passed to the media session.

Media Session Presentation Control

In accordance with one embodiment, media session 106 provides functionality for a number of different presentation control features among which include functionalities that start a presentation, stop a presentation, and pause a presentation. These functionalities are similar to the ones discussed above with respect to the media engine. Hence, for the sake of brevity, the description associated with these methods is not repeated.

Information Querying About the Media Session

In accordance with one embodiment, a set of APIs are provided that enable the media engine 104 to obtain information from the media session 106. As an example, consider the following non-exclusive methods that can be called by the media engine.

A first method, referred to as GetSessionGUID allows the media engine 104 to ascertain a globally unique identifier that is associated with a particular implementation of a media session. This allows the media engine to differentiate between various types of sessions (black box sessions vs non-black box sessions, for example).

A second method referred to as GetSessionCapabilities allows the media engine 104 to ascertain certain capabilities of the media session. In one embodiment, the bits returned through this method have the same value as the bits in the table appearing above—only the "MFENGINECAP"_ is replaced by "MFSESSIONCAPS"_ in all cases Media Session Shutdown In one embodiment, a method referred to as Shutdown causes all resources used by the media session to be properly shut down and released. An exemplary method IMFMediaSession::Shutdown( ) is described below.

Media Session Events

In much the same way that the media engine generates events for the application, the media session supports event generation functionality in which events can be generated by the media session and received by the media engine. For some of the events, the media engine performs a translation in which the session-generated event is translated to one of the events that the media engine typically generates and subsequently forwards to the application. For some session-generated events, the media engine acts on the information contained therein and does not propagate the events to the application.

An exemplary non-limiting list of events that can be generated by the media session and received by the media engine include a MESessionStarted which is generated when a session is started; a MESessionStopped which is generated when the session is stopped; a MESessionEnded which is generated when the session is ended; a MESessionPaused event which is generated when the session is paused; and a MEMediaRateChanged event which is generated when the media rate is changed.

Of course, other events can be generated by the media session and received by the media engine.

Exemplary Presentation Flow Process

Figure 2:
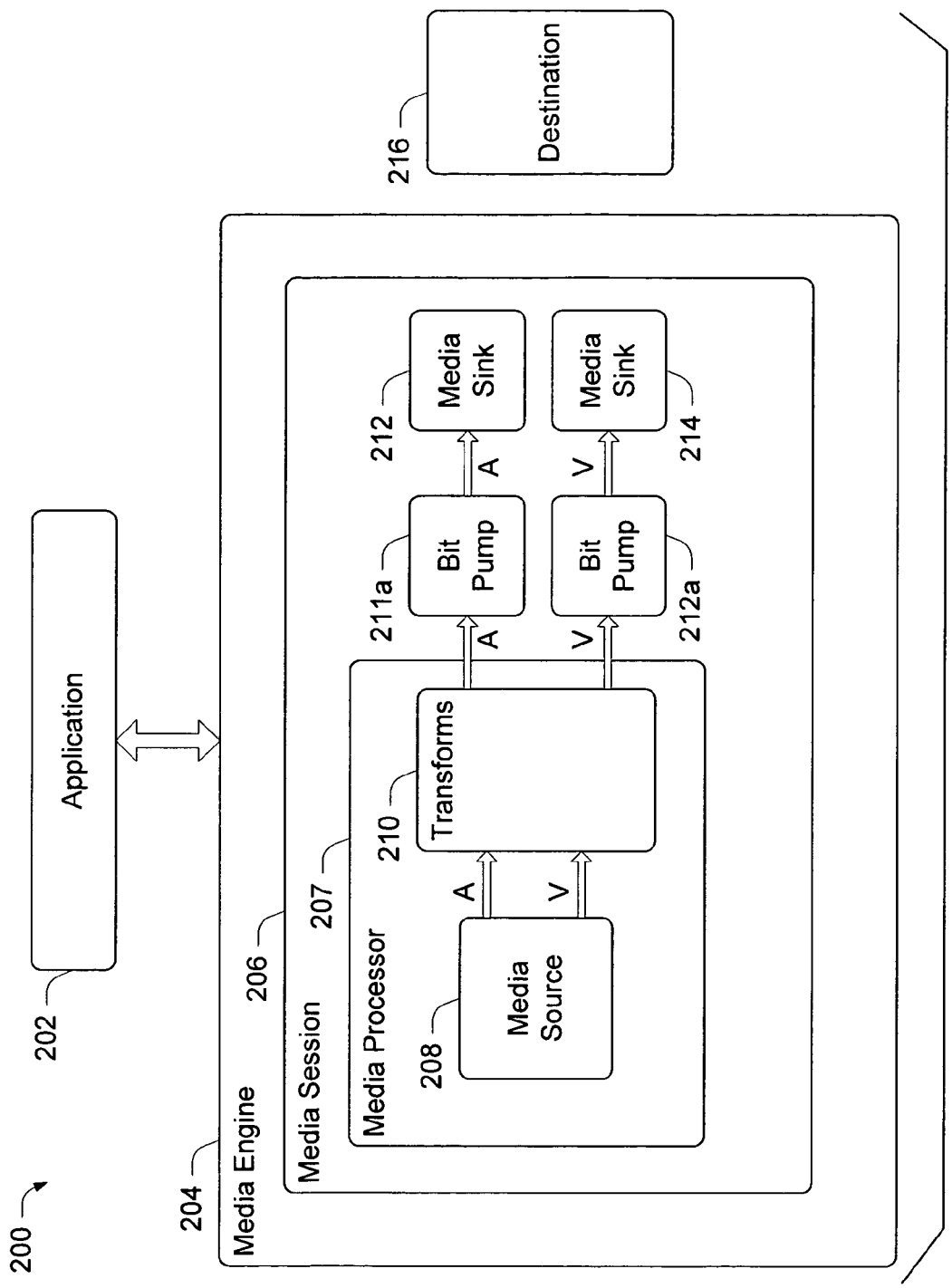
FIG. 2 is a block diagram of a system in accordance with another embodiment.

Having considered the system of FIG. 1 and the explanation above, consider now system 200 in FIG. 2. In this embodiment, similar numerals in the form of "2XX" have been utilized, where appropriate, to depict like or similar components. So, for example, the system of FIG. 2 comprises an application 202, media engine 204, media session 206, media sinks 212 and 214, and a destination 216. Notice in this embodiment that there are three new or additional components—a media processor 207 and bit pumps 211a, 211b.

In this embodiment, media processor 207 is a component that effectively wraps one or more media sources 208 and one or more transforms 210. That is, in some instances, it may be desirable to both read media content and perform some type of transform on the data. In this situation, the media processor is a component that can permit the read/transform functionality to be accomplished by a single component. As an example, consider two different situations—one in which the application wishes to have compressed data processed by the media engine, and one in which the application wishes to have decompressed data processed by the media engine. In the first instance, the application might simply cause a media source to be created that reads compressed data. In the second instance, the application might simply cause a media processor to be created that comprises a media source that reads compressed data and a transform that decompresses the compressed. In this instance, the data that emerges from the media processor is decompressed data. In the described embodiment, the media processor "looks" the same to the application as the media source. That is, in this embodiment, the media processor exposes a media source interface so that it effectively looks like a media source—albeit with added functionality in the form of transforms 210.

With respect to bit pumps 211a, 211b, consider the following. The bit pumps provide a component that is effective to acquire the data that is processed by the media processor 207. In this embodiment, the bit pumps are used to pull data from the media processor 207. This is different from processing systems that are effectively push models where data is pushed down the pipeline. Here, the bit pumps pull the data from the media processor 207 and push the data to a respective media sink 212, 214. In one embodiment, there is a one-to-one relationship between a bit pump and an associated stream sink. Specifically, in this embodiment, each media sink can have one or more stream sinks. For example, an ASF file sink can have multiple stream sinks for audio and video streams and there will be one bit pump per stream. One advantage of using bit pumps is that bit pumps can relieve the media sink components from having to include the logic that pulls the data from the media processor 207 or media stream. This, in turn, can lead to easing the design complexities and requirements of the individual media sinks. For example, in some embodiments, it may be desirable to pull data from a particular stream or media processor and push the data to two different media sinks, e.g. a renderer and a disk file. In this instance and in accordance with one embodiment, a topology is built to route data to two or more different outputs and the media processor 207 shuttles data along those paths. Once the data gets to an associated bit pump, the bit pump is utilized to provide the data to its associated sink.

Given the description of the system of FIG. 2, the discussion that follows provides a general overview of a typical multimedia scenario, along with a description of the roles that the media engine 204 and media session 206 play in driving the presentation. In the discussion that follows, each of the media engine (and its role) and media session (and its role) are discussed in sections under their own respective headings—i.e. "Media Engine Work" and "Media Session Work".

Media Engine Work

In accordance with one embodiment, the work that the media engine 204 performs during a presentation can be categorized, generally, under a number of different headings which appear below. The categories of media engine work include source resolution, setting up the media session, partial topology resolution, topology resolution and activation, presentation control, new presentations, and output changes.

Source Resolution

Source resolution pertains to the process by which the media engine 204 causes the appropriate media source to be created for the particular type of data that is to be read and subsequently processed by the system. Thus, this process obtains a media source from which the multimedia data can be read. This process is relevant when, for example, the OpenURL or OpenByteStream methods (discussed above and below) are called to open the multimedia. In either case, the media engine 204 passes the URL or the Byte Stream, respectively, to a component known as a source resolver. If the source resolver is given a URL, then it looks at the scheme of the URL (e.g. file://, http://, etc) to create a Byte Stream that will read from the specified location.

In both cases, the source resolver is able to look at the contents of the Byte Stream to determine the format of the bits (ASF, AVI, MPEG, etc) so that a media source can be instantiated that will understand that format. The other Open functions discussed above and below specify the media source directly.

Setting up the Media Session

During this process, the media engine asks the media source that is created for a presentation descriptor. In some embodiments, the presentation descriptor may specify that a custom media session is to be used. In many cases, however, custom media sessions may not be used in which case a default media session can be instantiated.

Partial Topology Resolution

During partial topology resolution, the media engine obtains a presentation descriptor from the media source and notifies the application of that particular presentation via the event MENewPresentation described above. If the application is interested in using that event to configure the destination 216, the media engine waits for the application to finish handling the event.

The media engine then negotiates with the application-provided destination and the destination can create one or more media sinks for the outputs of the presentation. In some embodiments, media sinks can have already been created and the destination simply hands them over to the media engine.

The media engine constructs a "partial topology", in the sense that the media engine indicates the source media streams and the output stream sinks, without necessarily specifying the transforms that will be needed to get there. Thus, referring to the FIG. 2 illustration, at this point in the process, components 207, 208, 212, 214 and 216 have either been created and/or are referenced.

Topology Resolution and Activation

In accordance with one embodiment, during topology resolution and activation, the media engine 204 asks the media session 206 to resolve the partial topology into a fully specified topology. The media engine 204 then sets the new fully-specified topology on the media session, which gives it to the media processor 207. As an example, consider that the media source that is created is one that reads a compressed WMV file. The sinks, on the other hand, are not configured to handle compressed data. Thus, during the topology resolution, the media session ascertains which transforms are necessary to provide the compressed data from the WMV file to the sinks and creates the appropriate transforms which, in this case, might comprise a decompressor and possibly resizers, color converters, resamplers, and the like.

In another embodiment, resolution and activation can be combined into a single operation. Specifically, the media engine 204 can set a partial topology on the media session 206 and the media session itself can resolve the partial topology into a fully-specified topology which it then provides to the media processor 207.

Presentation Control

With the media session having been set up and the topology resolved and activated, the application 202 now can control the progress of the presentation by calling start, stop, and pause methods on the media engine 204. The media engine, in turn, forwards these calls to the media session 206, which handles the calls.

New Presentations

As noted above, the media engine is configured to handle new presentations from the media source. As an example, consider the following. If, for example, the media source 208 is a timeline media source, then the media source 208 will notify the media session 206 of the upcoming new presentation by means of a new presentation event, which will, in turn, forward the event to the media engine 204. The media engine 204 can then repeat the partial topology resolution and topology resolution and activation processes described above, using a descriptor for the new presentation. Once playback of that new presentation is about to commence, an event MEPresentationSwitch (described above) is sent to the application 202.

Output Changes

As noted above, the media engine 204 is configured to handle output changes. As an example, consider the following. If the media engine 204 receives an event from an application-provided destination notifying it of a change on the output side, the media engine 204 can go through the partial topology resolution and topology resolution and activation processes described above, using a descriptor for the existing presentation. Once presentation using the new outputs is about to commence, an event MEOutputsUpdated (described above) can be sent to the application.

Media Session Work

The discussion below describes work that the media session 206 accomplishes in accordance with one embodiment. The work that the media session performs in accordance with this embodiment can be categorized, generally, under the following categories: full topology resolution, media processor creation, time source selection, presentation control, bit pumps, new presentations and output changes, time line processing and content protection, each of which is discussed under its own separate heading below.

Full Topology Resolution

In performing the topology resolution process described above, the media session 206 can utilize a component called a topology loader. The topology loader is used to determine which transforms, such as transforms 210 that are necessary or desirable to provide the data from the media source(s) 208 to the media sink(s) 212, 214.

Media Processor Creation

The media session 206 is responsible for creating the media processor 207. That is, the media session 206 owns the media processor 207. When the topology is set on the media session 206, the media session, in turn, sets the topology on the media processor 207. The media processor 207 follows the data flow laid out by the topology to transform data from the media source(s) 208 to the particular formats that are needed by the media sinks 212, 214.

Time Source Selection

One of the functions that the media session can perform pertains to time source selection. Specifically, upon starting a presentation, the media session 206 can make a determination as to which of the available time sources will be used to drive the presentation. Each component can then run its part of the presentation in synchronization with the time from the time source ascertained by the media session. The time source is also used in the presentation clock (owned by the media engine but given to the media session) for the purposes of reporting progress of the presentation.

Media sinks, such as sinks 212, 214, may optionally offer a time source. Typically, the audio renderer (i.e. audio sink) can offer a time source, and the time on the time source will be dictated by the audio device on the particular machine on which the presentation is presented. It is to be appreciated, however, that other media sinks may do so as well. In addition, a particular media source, e.g. live media sources such as device capture and network sources, may also provide some concept of time. In one embodiment, the media session takes care of attempting to make the time source it chooses run at a similar rate to that of the live media source. In one embodiment, the media session 206 can decide which of the time sources is the "highest priority" time source, and this time source is used by the main presentation clock, to which all clock-aware components synchronize their presentations.

Presentation Control

As noted above, the media session 206 can receive method calls to Start, Stop, and Pause from the media engine 204. These calls typically correspond to the applications calls that are made on the media engine 204.

The media session 206 can control the presentation via a Presentation Clock that it receives from the media engine 204. Starting, stopping and/or pausing the Presentation Clock results in all media sinks 212, 214 receiving notifications thereof and reacting appropriately. The media session 206 starts, stops, and/or pauses the media processor 207 by respectively calling its start, stop, and/or pause methods directly.

The media session 206 is configured, in this embodiment, to send an event to the media engine 204 after a given operation has been completed by all streams.

Bit Pumps

In accordance with the described embodiment, the media session 206 drives all data flow from the media processor 207 to the media sinks 212, 214. In accordance with one embodiment, bit pumps are employed as the abstraction that encapsulates the data flow management functionality within the media session. In the specific implementation example that is illustrated in FIG. 2, each media sink is associated with a bit pump. Specifically, media sink 212 is associated with bit pump 211a, and media sink 214 is associated with bit pump 211b. Additionally, in this specific example, the bit pumps operate by first requesting, from an associated media sink, a sample allocation. When the sample allocation request is filled by the media sink, the bit pump requests that the media processor 207 fill the sample with data. Once the sample is filled with data, the sample is handed by the bit pump to its associated media sink and the bit pump makes a request on the media sink for another sample allocation. It should be appreciated and understood that at any given time, more than one sample can be "in the air". In one embodiment, the media session is responsible for determining how many samples are supposed to be outstanding at once and making the appropriate requests from the media sinks' stream sinks.

New Presentations and Output Changes

In accordance with this embodiment, media session 206 is responsible for forwarding media processor 207's notification of an upcoming new presentation to media engine 204 and participating with topology resolution and activation, as described above in connection with the media engine.

Time Line Processing

In accordance with one embodiment, media session 206 is configured to reduce glitches at presentation startup time and when transitioning between presentations in a timeline.

In accordance with this embodiment, at startup time, media session 206 will get the first few samples of media data from media processor 207 and deliver them to the media sinks 212, 214 before starting the clock associated with the presentation. This processes uses a special "prerolling" capability on the media sinks that allows the media sinks to receive data before actually being started. In this embodiment, it is only after the media sinks receive data via the pre-rolling capability that media session 206 will start the presentation clock.

Because the media sinks have already received the initial data of the data stream, the chances that the media sinks will fall behind (i.e. referred to as a "glitch") at the beginning of the presentation are greatly reduced if not eliminated all together. This can effectively provide for a generally seamless presentation start.

At presentation transition boundaries (i.e. when changing from one presentation to another), media session 206 is configured to attempt to make the transition seamless, i.e. without interruption between the end of the first presentation and the beginning of the second. In accordance with this embodiment, the media session 206 accomplishes this by applying some logic to ensure that the "seamless stream" plays continuously throughout the transition, without waiting for other streams in the presentation to complete (which may cause a glitch during the transition).

Content Protection

In accordance with one embodiment, system 204 and more generally, systems that employ a media session component as described in this document, can employ techniques to ensure that media content that is the subject of a presentation is protected in accordance with rights that may be associated with the content. This concept is also referred to by some as "digital rights management".

Specifically, certain multimedia content may have specific rights associated with it. For example, the content provider may wish to restrict playback of this content to the use of only known, trusted transforms, media sinks and other components. Accordingly, content protection information associated with the media content may, but need not then be embedded in the content as will be appreciated by the skilled artisan. In accordance with this embodiment, media session 206 is configured to respect any content protection requirements by validating all of the components that are being inserted into the pipeline and by making sure that the components are allowed and will be performing allowed actions on the content. Validation can take place by any suitable measures. For example, in validating the component, the media session can then validate the component's signature, and that the signing authority is a trusted authority.

In accordance with one embodiment, the media session 206 can create a protected media path for such content. The protected media path is configured to make it very difficult if not impossible for unauthorized third parties to intercept the data flowing through the pipeline.

Desired Media Engine Configuration

One of the more common scenarios in which the above-described systems and methods can be employed pertains to setting up a simple playback of a multimedia presentation. From the application's point of view, it is desirable for the application to be able to accomplish the following steps in order to configure a multimedia presentation. The application should be able to create a media engine and a playback or presentation destination. The application should also be able to provide a handle to the presentation destination, e.g. a window in which a video for the presentation should be rendered. The application should also be able to call IMFMediaEngine::OpenURL, to supply a URL to the multimedia file to be presented, as well as a pointer to the playback destination. With these capabilities, the application can now cause the media presentation to be played back by using the IMFMediaEngine::Start/Stop/Pause APIs. In one embodiment, the application does not need to wait for any events to arrive as handing of these events are optional. In another embodiment, the application does handle events from the media engine for the open operation to complete.

Exemplary Method

Figure 3:
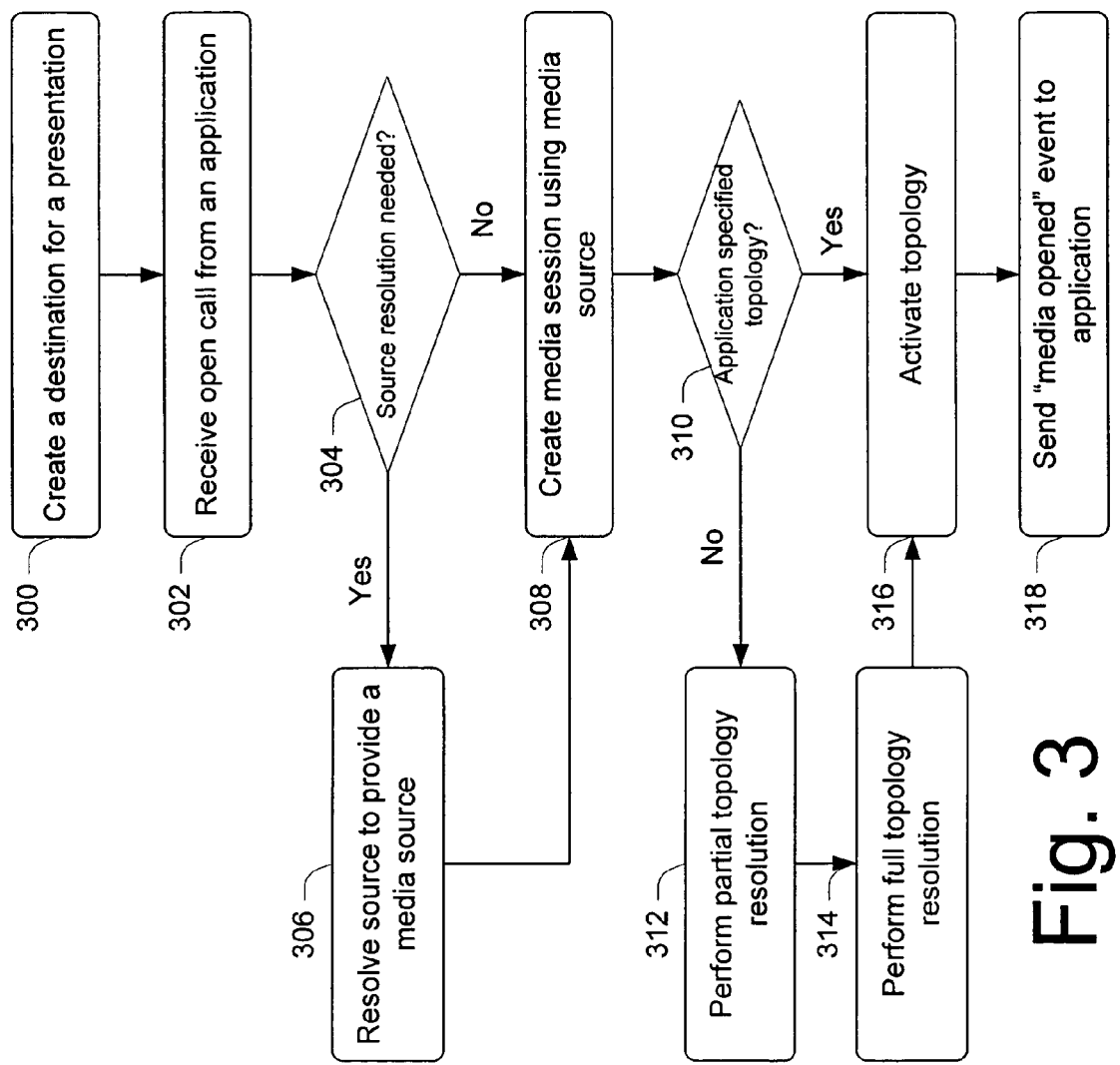
FIG. 3 is a flow diagram that describes steps in a method in accordance with one embodiment.

FIG. 3 is a method that describes steps in a method in accordance with one embodiment. The method can be implemented in connection with any suitable hardware, software, firmware or combination thereof. In one embodiment, the method can be implemented using the computer architectures such as those described above in connection with FIGS. 1 and 2. It is to be appreciated and understood, however, that other computer architectures can be utilized without departing from the spirit and scope of the claimed subject matter. In addition, it is to be appreciated that some of the acts described in this figure need not occur in the order in which they appear in the flow diagram.

Step 300 creates a destination for a presentation. In the example described above, a destination can be optionally created by an application. Step 302 receives an open call from the application. In the illustrated and described embodiment, this step is performed by the media engine. Specific examples of calls and associated call parameters are described above and below. Step 304 ascertains whether source resolution is needed. Source resolution is the process by which the media engine causes the appropriate media source (i.e. one that can read the particular type of data that is to be read) to be created. In the illustrated and described example, for certain open calls, source resolution is utilized, e.g. for OpenURL and OpenByteStream calls. In other cases, source resolution is not utilized because the source is specified, directly or indirectly, in the open call (i.e. OpenSource, OpenActivate, and OpenTopology). If source resolution is needed, then step 306 resolves a source to provide a media source and branches to step 308. Examples of how this can be done are given above.

If, on the other hand, source resolution is not needed, then the method branches to step 308 which creates a media session using the media source. This step can be performed multiple times in the event there are multiple media sources. Step 310 then ascertains whether the application has specified a topology that is to be used in presenting the presentation. If no topology is specified by the application, then step 312 performs a partial topology resolution using either the destination provided by the application or—if no destination was provided—using an implementation of the destination designed for playback through default outputs. An example of how this can be performed is described above. Step 314 then performs full topology resolution and branches to step 316. If the application has specified a topology at step 310, then the method branches to steps 316. Step 316 activates the topology for the presentation and step 318 sends a "media opened" event to the application. The "media opened" event notifies the application that it can now control the progress of the presentation by, for example, calling methods on the media engine.

Distributed (Remote) Presentations

In accordance with one embodiment, the media engine (104, 204) and media session (106, 206) are also capable of presenting audio and video to devices existing on remote machines in addition to device that exist on local machines. One example where this is useful is when an application is using the above described systems while running under a remote desktop application. One particular remote desktop application, and one which serves as the basis of the example described below, is Terminal Services (TS). In Windows XP®, an exemplary application is the Remote Desktop Connection application. It is to be appreciated and understood that the concepts described just below can be employed in connection with different remote applications without departing from the spirit and scope of the claimed subject matter.

In the Terminal Services (TS) case, the user is typically physically sitting at the console of a TS client, while running the application from a TS server machine. Any media that is to be played, in this example, is sourced from the TS server, but needs to be sent over a network to the TS client for rendering.

In accordance with the described embodiment, the media engine/media session are configured to send compressed data over the network, in distributed scenarios, and the work of decompression and rendering is conducted entirely on the machine where rendering is to take place—i.e. at the TS client. This allows high-quality content to be played remotely over any particular network connection. It also ensures that the media content presented to the user goes through the same components (i.e. decoders and renderers), as is does in the regular local playback scenario.

Figure 4:
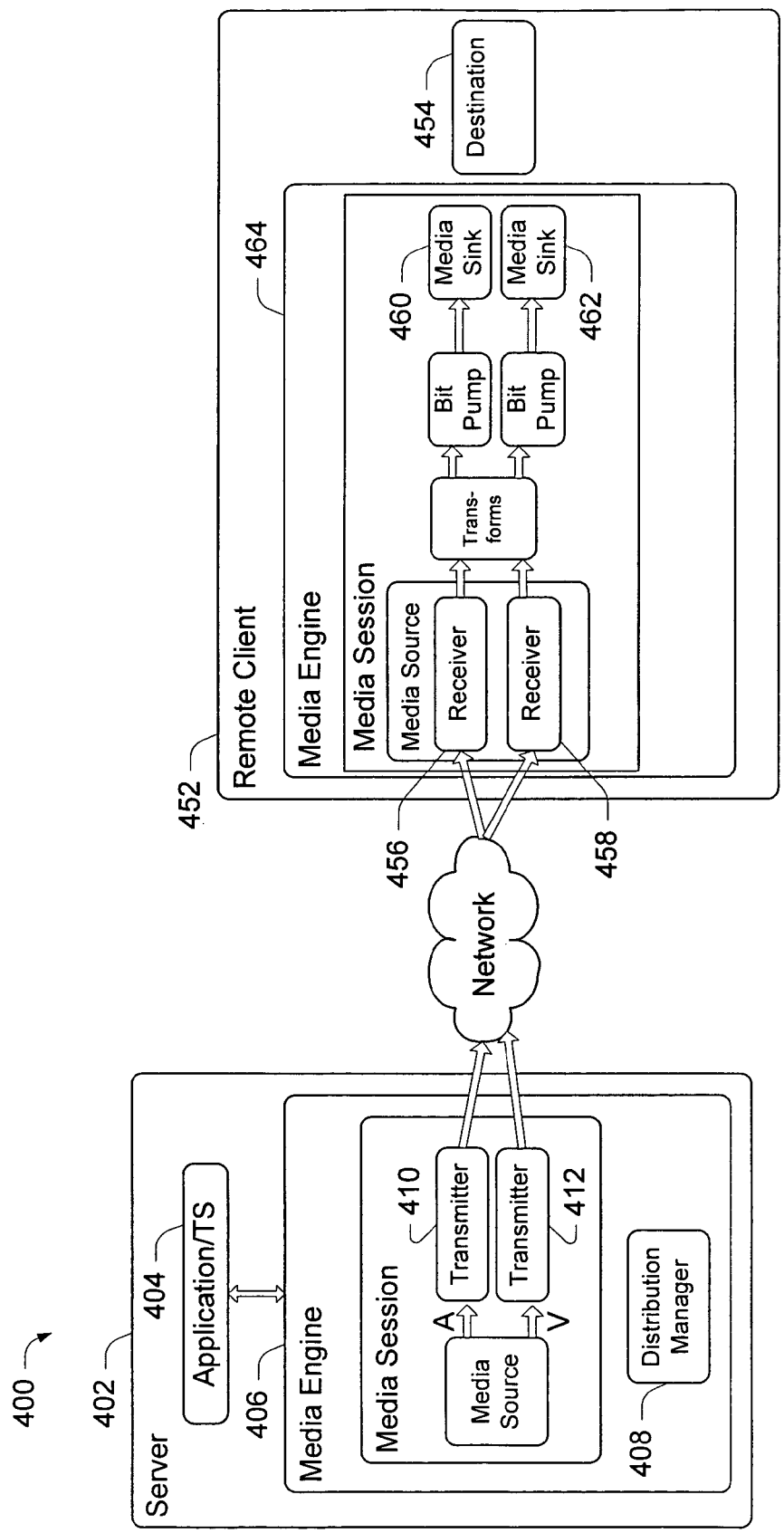
FIG. 4 is a block diagram of a system in accordance with another embodiment.

As an example scenario in which remote presentations can be rendered, consider FIG. 4 and the system shown generally at 400. System 400 comprises, in this example, a server 402 and one or more remote clients an exemplary one of which is shown at 452. Server 402 and remote client 452 are communicatively linked via a network as indicated. The network can comprise any suitable network such as, for example, the Internet. In this particular described embodiment, some of the components are the same as or similar to components discussed above. Accordingly, for the sake of brevity, some of the components are not described again.

In this example, an application 404 on the server 402 creates a playback destination 454 in much the same way it does in the local scenario. The application 402 calls OpenURL on a media engine 406 on server 402 with the destination 454. The media engine 406 creates a partial topology, as noted above, and asks the destination 454 for media sinks. The destination 454 then queries Terminal Services and finds out that the presentation is to take place in connection with a distributed scenario. Information is returned that indicates that the media sinks are located on a remote machine—the TS client machine 452.

The media engine 406 gives its partial topology to a distribution manager 408 to determine whether distribution is needed, and if so, to distribute the topology between the local and remote machines. For each media stream that needs to be remoted, the distribution manager performs a number of tasks. First, the distribution manager 408 creates a network transmitter on the local topology which will send the compressed media samples over the network to the remote machine where the samples need to be rendered. As noted, a network transmitter is created for each stream. Exemplary network transmitters are shown at 410, 412. It is to be appreciated that the network transmitters are also media sinks, so the processing pipeline will treat the transmitters as regular sinks and will not need to do anything special with regard to being in a distributed scenario. Next, the distribution manager 408 causes network receivers to be placed on the remote topology. Exemplary network receivers are shown at 456, 458 respectively. The network receivers receive the compressed media samples from the local transmitters on the server, and sends them downstream to get rendered by media sinks 460, 462 respectively. It is to be appreciated and understood that the network receivers are treated as media sources, so the processing pipeline on the remote client treats the network receivers as regular media sources without needing to know that the pipeline is running in a distributed scenario.

For each remote machine involved—in this case remote client 452—the distribution manager 408 creates a media engine 464 on the remote machine and gives it a presentation destination 454 and the network receivers 456, 458 that it needs to pull data that is to be rendered on its machine. At this point, the distributed topology is set up, and all machines are ready to start presenting media.

The application 404 on the TS server 402 can then call start on the media engine 406, just as it does in the local scenario. The media engine 406 then starts its local media pipeline and calls start on the distribution manager 408 which, in turn, calls start on all media engines (e.g. media engine 464) on the remote machines. This causes the remote media engines to start their own media pipelines. Once all media pipelines are running, media flows from the media source on the TS server 402 through the network transmitters 410, 412 and receivers 456, 458 to the eventual audio and video renderers on the remote machines—in this case the TS client 452.

It is to be appreciated and understood that the application does not have to do anything differently between the distributed and local scenarios. The same can be said of the media source.

Provision of Additional Services

In accordance with one embodiment, advanced multimedia applications can take advantage of a wide and extensible array of services made available by the media engine and media session. These can be accessed by using a IMFGetService interface exposed by the Media Engine, which will return services exposed by the media engine, the media session, or any one of the media sources, sinks, or other components that are in use.

This service architecture is extensible and can comprise services such as rate support and rate control, setting external clocks for reference by the media engine; volume control for audio; frame caching support for editing scenarios, and video renderer configuration services, to name just a few.

Application Program Interfaces

The following section provides documentation of APIs associated with an exemplary implementation of the above-described systems. It is to be appreciated and understood that APIs other than the ones specifically described below can be utilized to implement the above-described systems and functionality without departing from the spirit and scope of the claimed subject matter.

The first set of APIs that appear are APIs that are exposed by the media engine—i.e. IMFMediaEngine APIs.

IMFMediaEngine

```
{
// Open Methods
  HRESULT OpenURL( [in] LPCWSTR pwszURL,
      [in] IUnknown *pStreamSelection,
      [in] IMFDestination *pDestination );
  HRESULT OpenSource( [in] IMFMediaSource *pSource,
      [in] IUnknown *pStreamSelection,
      [in] IMFDestination *pDestination );
  HRESULT OpenActivate( [in] IActivate *pActivate,
      [in] IUnknown *pStreamSelection,
      [in] IMFDestination *pDestination );
```

-continued

```
HRESULT OpenByteStream( [in] LPCWSTR pwszURL,
        [in] IMFByteStream *pByteStream,
        [in] IUnknown *pStreamSelection,
        [in] IMFDestination *pDestination );
HRESULT OpenTopology( [in] IMFTopology *pTopology,
        [in] IUnknown *pStreamSelection
        [in] IMFDestination *pDestination );
HRESULT Close( );
HRESULT Shutdown( );
// GetState, GetCapabilities
HRESULT GetState( [out] IMFMediaEngineState **ppState );
HRESULT GetCapabilities( [out] DWORD *pdwCaps );
// Start/Stop/Pause
HRESULT Start( [in] const GUID *pguidTimeFormat,
        [in] const PROPVARIANT *pvarStartPosition
        [in] const PROPVARIANT *pvarEndPosition );
HRESULT Stop( );
HRESULT Pause( );
// GetDestination
HRESULT GetDestination( [out] IMFDestination **ppDestination );
//GetClock
HRESULT GetClock( [out] IMFClock **ppClock );
// GetMetadata
HRESULT GetMetadata( [in] REFIID riid,
        [out] IUnknown **ppunkObject );
// Statistics
HRESULT GetStatistics( [out] IUnknown **ppStats );
};
```

IMFMediaEngine::OpenURL( )

The OpenURL provides Open functionality in the case where the data source is identified through a URL (Uniform Resource Locator). The media engine will resolve this URL to the appropriate source object for use in the engine.

Syntax

```
HRESULT OpenURL( [in] LPCWSTR pwszURL,
        [in] IUnknown *pStreamSelection,
        [in] IMFDestination *pDestination );
```

Parameters pwszURL

[out] Specifies the Uniform Resource Locator to be opened.

pStreamSelection

[in] Specifies the stream and format selection parameters to be used.

pDestination

[in] Specifies the destination for the data.

Return Values

If the method succeeds, it returns S_OK. If it fails, it returns an error code.

Remarks

This is an asynchronous call; if it returns successfully, an MEMediaOpened event will be generated asynchronously. If the process fails asynchronously, this event will contain a failure code.

IMFMediaEngine::OpenSource( )

The OpenSource method is similar to the OpenURL except it accepts a Media Source object as input in place of a URL. The media engine bypasses the source resolution step and performs the same remaining steps as described in the Open documentation.

Syntax

```
HRESULT OpenSource( [in] IMFMediaSource *pSource,
        [in] IUnknown *pStreamSelection,
        [in] IMFDestination *pDestination );
```

Parameters pSource

[out] Specifies a pointer to the Media Source to provide data.

pStreamSelection

[in] Specifies the stream and format selection parameters to be used.

pDestination

[in] Specifies the destination for the data.

Return Values

If the method succeeds, it returns S_OK. If it fails, it returns an error code.

Remarks

This is an asynchronous call; if it returns successfully, an MEMediaOpened event will be generated asynchronously. If the process fails asynchronously, this event will contain a failure code.

IMFMediaEngine::OpenActivate

The OpenActivate method provides Open functionality, where the data source is provided as an IActivate. Typically this IActivate is a retrievable parameter and represents some sort of hardware device capable of sourcing media data.

Syntax

```
HRESULT OpenActivate( [in] IActivate *pActivate,
        [in] IUnknown *pStreamSelection,
        [in] IMFDestination *pDestination );
```

Parameters pActivate

[out] Specifies a pointer to the Function Instance to provide data.

pStreamSelection

[in] Specifies the stream and format selection parameters to be used.

pDestination

[in] Specifies the destination for the data.

Return Values

If the method succeeds, it returns S_OK. If it fails, it returns an error code.

Remarks

This is an asynchronous call; if it returns successfully, an MEMediaOpened event will be generated asynchronously. If the process fails asynchronously, this event will contain a failure code.

IMFMediaEngine::OpenByteStream( )

The OpenByteStream method is similar to the OpenURL except it accepts a Byte Stream object as input in place of a URL. The media engine bypasses the scheme resolution step and performs the same remaining steps as described in the Open section.

Syntax

```
HRESULT OpenByteStream( [in] LPCWSTR pwszURL,
        [in] IMFByteStream *pByteStream,
        [in] IUnknown *pStreamSelection,
        [in] IMFDestination *pDestination );
```

Parameters
pwszURL
[in] Optionally specifies the URL of the provided Byte Stream. May be NULL if the URL is unknown.
pByteStream
[in] Specifies a pointer to Byte Stream object to provide data.
pStreamSelection
[in] Specifies the stream and format selection parameters to be used.
pDestination
[in] Specifies the destination for the data.
Return Values
If the method succeeds, it returns S_OK. If it fails, it returns an error code.
Remarks
This is an asynchronous call; if it returns successfully, an MEMediaOpened event will be generated asynchronously. If the process fails asynchronously, this event will contain a failure code.
The pwszURL argument is optional; if the URL of the Byte Stream is known it should be provided to allow efficient source resolution.
IMFMediaEngine::OpenTopology( )
The OpenTopology method is similar to the OpenURL except it accepts a Topology object as input in place of a URL. The media engine bypasses normal pipeline construction logic and simply uses the Topology provided.
Syntax

```
HRESULT OpenTopology( [in] IMFTopology *pTopology,
        [in] IUnknown *pStreamSelection,
        [in] IMFDestination *pDestination );
```

Parameters
pTopology
[out] Specifies a pointer to Byte Stream object to provide data.
pStreamSelection
[in] Specifies the stream and format selection parameters to be used.
pDestination
[in] Specifies the destination for the data.
Return Values
If the method succeeds, it returns S_OK. If it fails, it returns an error code.
Remarks
This is an asynchronous call; if it returns successfully, an MEMediaOpened event will be generated asynchronously. If the process fails asynchronously, this event will contain a failure code.
NULL may be passed for the pDestination parameter in this case, indicating that the topology contains all necessary information regarding the media sinks. In this case a source-initiated topology change will be treated as a failure case.
IMFMediaEngine::Close( )
The Close method provides a way to end processing media samples and close the currently active media source.
Syntax
HRESULT Close( );
Parameters
None
Return Values
If the method succeeds, it returns S_OK. If it fails, it returns an error code.
Remarks
This is an asynchronous method; if it succeeds, an MEMediaClosed event is generated. This event may contain a failure code in the case that the Media Engine fails asynchronously.
IMFMediaEngine::Shutdown( )
The Shutdown method causes all the resources used by the Media Engine to be properly shutdown and released. This is an asynchronous operation which queues the MEShutdown event upon completion. Upon successful completion of this operation all methods on the Media Engine will return MF_E_SHUTDOWN when called.
Syntax
HRESULT Shutdown( );
Parameters
none
Return Values
If the method succeeds, it returns S_OK. If it fails, it returns an error code.
Remarks
This method asynchronously queues an MEShutdown event. All referenced media engine must still be released (via the IUnknown::Release method) to ensure no memory is leaked. Upon successful completion of this operation, all methods (including calling Shutdown again) on the media engine will return MF_E_SHUTDOWN. The exception is the IMFMediaEventGenerator calls which are still allowed. However, the Media Engine will queue no more events to the event generator after queuing the MEShutdown event. After calling Shutdown, the user can call the global MF function MFShutdown instead of waiting for the MEShutdown event. MFShutdown will ensure that the Shutdown operation runs to completion. Note that events may be queued and callbacks invoked in the process of calling MFShutdown.
IMFMediaEngine::GetState
The GetState method synchronously fetches the current state of the engine.
Syntax
HRESULT GetState([out] IMFMediaEngineState**ppState);
Parameters
ppState
[out] A pointer to an IMFMediaEngine interface. The methods of the IMFMediaEngineState interface give more information about the state.
Return Values
If the method succeeds, it returns S_OK. If it fails, it returns an error code.
IMFMediaEngine::GetCapabilities
GetCapabilities returns a DWORD describing what operations are allowed on the engine at the current moment.
Syntax
HRESULT GetCapabilities(DWORD*pdwCaps);
Parameters
pdwCaps
[out] A bitwise OR of the current capabilities of the engine.
Return Values
If the method succeeds, it returns S_OK. If it fails, it returns an error code.
IMFMediaEngine::Start( )
The Start method provides an asynchronous way to start processing media samples. This operation gets the media samples moving through the pipeline and delivered to the appropriate sinks. The StartOffset parameter lets you specify the location in the media at which to start processing. The Duration parameter lets you specify the length of media that needs to be processed beginning at the StartOffset. Alternately or additionally, an EndOffset parameter can be used to specify the location in the media at which to end processing. An MEMediaStarted event is generated to mark the completion of this asynchronous operation.
Syntax

```
HRESULT Start( [in] const GUID *pguidTimeFormat,
        [in] const PROPVARIANT *pvarStartPosition,
        [in] const PROPVARIANT *pvarEndPosition );
```

Parameters
guidTimeFormat
[in] Specifies the time format used for pvarStartPosition and pvarEndPosition parameters.
pvarStartPosition
[in] A PROPVARIANT specifying the start time, in the units specified by guidTimeFormat, at which to start processing
pvarEndPosition
[in] A PROPVARIANT specifying the end time, in the units specified by guidTimeFormat, at which to end processing
Return Values
If the method succeeds, it returns S_OK. If it fails, it returns an error code.
Remarks
Use GUID_NULL for guidTimeFormat to indicate that llStartOffset is in the standard (100-ns) units.
IMFMediaEngine::Stop( )
The Stop method provides an asynchronous way to stop media sample processing in the engine. An MEMediaStopped event is generated to mark the completion of this operation.
Syntax
HRESULT Stop( );
Parameters
none
Return Values
If the method succeeds, it returns S_OK. If it fails, it returns an error code.
IMFMediaEngine::Pause( )
The Pause method provides an asynchronous way to stop media sample processing in the engine. An MEMediaPaused event is generated to mark the completion of this operation.
Syntax
HRESULT Pause( );
Parameters
none
Return Values
If the method succeeds, it returns S_OK. If it fails, it returns an error code.
IMFMediaEngine::GetDestination( )
The GetDestination method returns the current destination, as specified in one of the OpenXXX methods.
Syntax

```
HRESULT GetDestination( [out] IMFDestination **ppDestination );
```

Parameters
ppDestination
[out] Specifies a pointer to a variable where the destination will be stored.

Return Values
If the method succeeds returns S_OK. If it fails, a suitable error code is returned.
IMFMediaEngine::GetClock( )
The GetClock method returns the presentation clock being used for rendering the current media.
Syntax
HRESULT GetClock([out] IMFClock**ppClock);
Parameters
ppClock
[out] Specifies a pointer to a variable where the clock object will be stored.
Return Values
If the method succeeds, it returns S_OK. If it fails, it returns an error code.
IMFMediaEngine::GetMetadata( )
The GetMetadata method provides a way to access the metadata for the current media.
Syntax

```
HRESULT GetMetadata( [in] REFIID riid,
        [out] IUnknown** ppunkObject );
```

Parameters
riid
[in] Specifies the IID of the interface being requested.
ppunkObject
[out] Specifies a pointer to a variable where the requested object will be stored.
Return Values
If the method succeeds, it returns S_OK. If it fails, it returns an error code.
Remarks
The riid parameter is not supported currently. A property store object is returned in all cases.
IMFMediaEngine::GetStatistics( )
The GetStatistics method provides a way to access the statistics.
Syntax
HRESULT GetStatistics([out] IUnknown**ppStats);
Parameters
ppStats
[in] The stats.
Return Values
If the method succeeds, it returns S_OK. If it fails, it returns an error code.
IMFStreamSelector
The media engine exposes the IMFStreamSelector interface as part of the Stream Selector Service mentioned above.

```
interface IMFStreamSelector : IUnknown
{
    HRESULT SetManualStreamSelection( [in] BOOL fManual );
    HRESULT GetManualStreamSelection( [out] BOOL *pfManual );
    HRESULT SetAutomaticStreamSelectionCriteria
        ( [in]  IPropertyStore *pCriteria );
};
```

IMFStreamSelector::SetManualStreamSelection( )
The SetManualStreamSelection method configures the stream selection mode of the Media Engine.
Syntax
HRESULT SetManualStreamSelection([in] BOOL fManual);

Parameters fManual

[in] FALSE for automatic stream selection, any other value for manual stream selection.

Return Values

If the method succeeds, it returns S_OK. If it fails, it returns an error code.

Remarks

This method may only be called when the Media Engine is in the stInitial or stOpened states.

IMFStreamSelector::GetManualStreamSelection)

The GetManualStreamSelection method retrieves the stream selection mode of the media engine.

Syntax

HRESULT SetManualStreamSelection([in] BOOL*pfManual);

Parameters pfManual

[out] A pointer to a BOOL that retrieves the mode.

Return Values

If the method succeeds, it returns S_OK. If it fails, it returns an error code.

IMFStreamSelector::SetAutomaticStreamSelectionCriteria( )

The SetAutomaticStreamSelectionCriteria method sets the stream selection criteria that the Media Engine uses.

Syntax

HRESULT SetAutomaticStreamSelectionCriteria([in] IPropertyStore*pCriteria);

Parameters pCriteria

[out] The new criteria to use.

Return Values

If the method succeeds, it returns S_OK. If it fails, it returns an error code.

Remarks

This method may only be called if the Media Engine is in automatic stream selection mode. Otherwise an error will be returned. Any of the OpenXXX( ) methods on the Media Engine also set the stream selection criteria.

States

In the illustrated and described embodiment, the media engine exposes a state. This allows applications to query the engine synchronously and get a reasonable idea of what the engine is doing without requiring the application to listen to the history of events up until the current time.

In the illustrated and described embodiment, the engine states are fairly broad and varied. For more granular information, the application must listen to events or use services off the engine. Information that is available via services is in general not duplicated in the state model. The data type used to express state is a structure, with a major type and additional state specific attributes. The simplest callers may choose to look only at the major type. Advanced callers may want to look at the state specific attributes.

EngineStateType Enum

The major types of the states are values from the EngineStateType enum. In this example, there are eight states. The first six can be considered primary states, and the last two can be considered secondary states.

```
enum EngineStateType
{
    StInitial,
    StConnecting,
```

-continued

```
    StOpened,
    StRunning,
    StPaused,
    StShutdown,
    StTransitioning,
    StSuspended
};
```

StInitial

When the engine is just created it is in this state. Subsequently when IMFMediaEngine::Close is called the engine returns to this state after the close action completes.

StConnecting

When the engine is trying to open a networked media and is connecting to the server, the engine goes into this state. While the engine is running if the connection is lost and the engine attempts to reconnect, the engine goes into this state again.

StOpened

When the engine has successfully opened a media, via OpenURL, OpenSource, OpenActivate, OpenByteStream, or OpenTopology, the engine goes into this state. Subsequently the engine returns to this state if playback stops either because the client called IMFMediaEngine::Stop, or because the end of the media was reached.

StRunning

When the engine has successfully started as a result of IMFMediaEngine::Start, the engine goes into this state. It does not matter what rate the engine is running at.

StPaused

When the engine has successfully paused as a result of IMFMediaEngine::Pause, the engine goes into this state.

StShutdown

After the engine has shutdown as a result of IMFMediaEngine::Shutdown, the engine goes into this state.

StTransitioning

This is a secondary state. When an asynchronous call is made on the engine, the engine immediately goes into this state. When the asynchronous call completes, the engine goes into the target state. The EngineState structure contains two additional parameters if the major type is StTransitioning. These parameters indicate the major type of the previous state, and an EngineMethodID enum describing the API call being processed currently.

StSuspended

This is also a secondary state. If the opening or running of the engine is waiting on some user action then the engine goes into this state. The EngineState structure contains one additional parameter in this case. The additional parameter is an EngineSuspensionReason enum indicating why the engine was suspended.

EngineMethodID

This is an enum that lists all methods of the engine that could result in a state change. Most of these are methods on the IMFMediaEngine interface with the exception of eapiRateChange.

```
enum EngineMethodID
{
    eapiOpenURL,
    eapiOpenSource,
    eapiOpenActivate,
    eapiOpenByteStream,
```

```
        eapiOpenTopology,
        eapiStart,
        eapiPause,
        eapiStop,
        eapiClose,
        eapiShutdown,
        eapiRateChange // User is trying to change rate via
the rate control service
        };
```

EngineSuspensionReason

This is a list of reasons why the engine is suspended waiting on user action.

```
        enum EngineSuspensionReason
        {
                esuspLicenseAcquisition,
                esuspIndividualization,
                esuspCodecMissing
        );
```

IMFMediaEngineState Interface

From the description of states so far it may be evident that a state comprises a type and some additional attributes. All this is packaged into an IMFMediaEngineState interface. Packaging this as an interface allows for passing the state around in a compact manner. It also gives an option of adding more state types and more state-specific attributes in the future. This interface has two methods as described below.

IMFMediaEngineState::GetStateType( )

This method fetches the major type of the state. E.g. stRunning, stPaused.

Syntax

HRESULT  IMFMediaEngineState::GetStateType([out] EngineStateType*pStateType)

Parameters pStateType

[out] A pointer to an EngineStateType enum. This is filled with the major type (one of the enum values of EngineStateType).

Return Values

If the method succeeds, it returns S_OK. If it fails, it returns an error code.

IMFMediaEngineState::GetAttribute( )

This method fetches additional attributes of the state. The available attributes are specific to the major type of the state e.g. if the major type of the state is stTransitioning, then an attribute MF_ENGINE_METHOD_ID will be available, whose value is one of the EngineMethodID enum values.

This attribute will not be available if the major type of the state is anything else.

Syntax

```
        HRESULT   IMFMediaEngineState::GetAttribute(   [in]   GUID
guidAttribute, [out] PROPVARIANT *pvarAttribute )
```

Parameters guidAttribute

[in] The guid of the attribute whose value is desired.

pvarAttribute

[out] The value of the attribute.

Return Values

If the method succeeds, it returns S_OK. If it fails, it returns an error code.

Media Session Application Program Interfaces

The following discussion provides details with respect to APIs that are exposed by a media session.

IMFMediaSession

IMFMediaSession::SetTopology( )

The SetTopology method provides an asynchronous way of initializing a full topology on the media session. The ResolveTopology method can be used to resolve a partial one into a full topology. An MENewPresentation event is generated to mark the completion of the SetTopology call.

Syntax

```
        HRESULT SetTopology(
                [in] IMFTopology* pTopology
                );
```

Parameters pTopology

[out] Specifies a pointer to a full topology.

Return Values

If the method succeeds, it returns S_OK. If it fails, it returns an error code.

IMFMediaSession::Start( )

The Start method provides an asynchronous way to start processing media samples. This operation gets the media samples moving through the pipeline and delivered to the appropriate sinks. The Startoffset parameter lets you specify the location in the media at which to start processing. The Duration parameter lets you specify the length of media that needs to be processed beginning at the StartOffset. An MESessionStarted event is generated to mark the completion of this asynchronous operation.

Syntax

```
HRESULT Start([in] const GUID *pguidTimeFormat,
        [in] const PROPVARIANT *pvarStartPosition,
        [in] const PROPVARIANT *pvarEndPosition     );
```

Parameters guidTimeFormat

[in] Specifies the time format used for pvarStartPosition and pvarEndPosition parameters.

pvarStartPosition

[in] A PROPVARIANT specifying the start time, in the units specified by guidTimeFormat, at which to start processing pvarEndPosition

[in] A PROPVARIANT specifying the end time, in the units specified by guidTimeFormat, at which to end processing Return Values If the method succeeds, it returns S_OK. If it fails, it returns an error code.

Remarks

Use GUID_NULL for guidTimeFormat to indicate that llStartOffset is in the standard (100-ns) units.

IMFMediaSession::Pause( )

The Pause method provides an asynchronous way to stop media sample processing in the session. An MESession-Paused event is generated to mark the completion of this operation.

Syntax
HRESULT Pause( );
Parameters
None
Return Values
If the method succeeds, it returns S_OK. If it fails, it returns an error code.

IMFMediaSession::Stop( )

The Stop method provides an asynchronous way to stop media sample processing in the session. An MESession-Stopped event is generated to mark the completion of this operation.

Syntax
HRESULT Stop( );
Parameters
none
Return Values
If the method succeeds, it returns S_OK. If it fails, it returns an error code.

IMFMediaSession::Shutdown( )

The Shutdown method causes all the resources used by the media session to be properly shutdown and released. This is a synchronous operation and upon successful completion of this operation all methods on the Media Session will return failures if called.

Syntax
HRESULT Shutdown( );
Parameters
none
Return Values
If the method succeeds, it returns S_OK. If it fails, it returns an error code.

IMFMediaSession::SetPresentationClock( )

The SetPresentationClock method provides a way to specify the presentation clock to be used in rendering the current media session.

Syntax

```
HRESULT SetPresentationClock(
    [in] IMFPresentationClock* pClock
);
```

Parameters
ppClock
[in] Specifies a pointer to a presentation clock object.
Return Values
If the method succeeds, it returns S_OK. If it fails, it returns an error code.

IMFMediaSession::GetPresentationClock( )

The GetPresentationClock method returns the presentation clock being used for rendering the current media session.

Syntax

```
HRESULT GetPresentationClock(
    [out] IMFPresentationClock** ppClock
);
```

Parameters
ppClock
[out] Specifies a pointer to a variable where the presentation clock object will be stored.
Return Values
If the method succeeds, it returns S_OK. If it fails, it returns an error code.

CONCLUSION

The media processing methods, systems and application program interfaces (APIs) described above provide a simple and unified way of rendering media from an origin to a destination of choice without requiring intimate knowledge about the underlying components, their connectivity and management. The systems and methods are flexible in terms of their implementation and the various environments in which the systems and methods can be employed. The systems, methods and APIs can be employed by applications that range from simple to complex, thus further extending the various scenarios in which the systems, methods and APIs can be employed.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
   first and second computing devices; and
   a media engine distributed among and implemented in the first and second computing devices and configured to communicatively interact with an application of the second computing device to present a presentation on the second computing device, the first and second computing devices being remote from each other,
   the media engine implemented in the first computing device being configured to:
     use one or more media sources individual ones of which serving as a source of media content; and
     first partially resolve a topology that is to be utilized to present the presentation, and then cause a full topology to be resolved and activated,
     distribute the full topology to the second computing device, and
   the media engine implemented in the second computing device being configured to use:
     one or more transforms linked to the full topology, communicatively linked with one or more media sources, and configured to operate on data received from the one or more media sources; and
     one or more media sinks configured to sink a media stream.

2. The system of claim 1, wherein the media engine exposes an application program interface that is used by the application to interact directly with the media engine, and indirectly with components used by the media engine.

3. The system of claim 1, wherein the media engine is configured to provide support for both linear and non-linear media sources.

4. The system of claim 1, wherein the media engine is configured to provide transport control for the media content.

5. The system of claim 1, wherein the media engine is configured to provide for asynchronous building and management of a media pipeline given a source of media content.

6. The system of claim 1, wherein the media engine is configured to provide source resolution for the media content.

7. The system of claim 1, wherein the media engine is configured to enable adjustment of a media processing pipeline configuration.

8. The system of claim 1, wherein the media engine is configured to support multiple different modes of stream selection.

9. The system of claim 8, wherein one mode comprises a mode in which the media engine selects which media streams are used.

10. The system of claim 8, wherein one mode comprises a mode in which the application selects which media streams are used.

11. The system of claim 8, wherein one mode comprises a mode in which the media engine selects which media streams are used, and another mode comprises a mode in which the application selects which media streams are used.

12. The system of claim 1, wherein the media engine is configured to set up a media session which uses said one or more media sources, said one or more transforms, and said one or more media sinks, said media session being configured to fully resolve a partial topology that has been resolved by said media engine.

13. The system of claim 12, wherein the media session is configured to fully resolve said partial topology by at least ascertaining transforms that are to be placed between the media sources and the media sinks.

14. The system of claim 12, wherein the media engine is configured to receive calls from the application and forward the calls to the media session, said calls comprising calls to start, stop and pause the presentation.

15. The system of claim 12, wherein the media session is configured to create a media processor that uses one or more media sources and one or more transforms.

16. The system of claim 12, wherein the media session is configured to create a media processor that uses one or more media sources and one or more transforms, wherein the media session is configured to set a topology on the media processor.

17. The system of claim 12, wherein the media session is configured to make determinations as to which time sources are to be used to drive the presentation.

18. The system of claim 12, wherein the media session is configured to prevent drift between a rate of media sources and a rate of a time source being used in live scenarios.

19. The system of claim 12, wherein the media session is configured to receive calls from the media processor to at least start, stop and pause the presentation.

20. The system of claim 12, wherein the media session is configured to receive calls from the media processor to at least start, stop and pause the presentation, wherein the media session is configured to send events to the media engine associated with calls that the media session receives from the media engine.

21. The system of claim 12, wherein the media session is configured to reduce glitches associated with a presentation by prerolling media data samples to one or more media sinks.

22. The system of claim 12, wherein the media session is configured to validate one or more component that handle data of the presentation.

23. The system of claim 1, wherein the media engine partially resolves said topology by at least determining one or more media sources and one or more media sinks for the presentation.

24. A system comprising:
first and second computing devices; and
a media engine distributed among and implemented in the first and second computing devices and configured to communicatively interact with an application of the second computing device to present a presentation on the second computing device, the first and second computing devices being remote from each other,
the media engine being configured to a provide plurality of open methods that can be called by the application to specify data sources in different manners,
the media engine implemented in the first computing device being configured to:
use one or more media sources individual ones of which serving as a source of media content; and
first partially resolve a topology that is to be utilized to present the presentation, and then cause a full topology to be resolved and activated,
distribute the full topology to the second computing device, and
the media engine implemented in the second computing device being configured to use:
one or more transforms linked to the full topology, communicatively linked with one or more media sources, and configured to operate on data received from the one or more media sources; and
one or more media sinks configured to sink a media stream.

25. The system of claim 24, wherein the media engine is configured to send events associated with a media presentation to the application.

26. The system of claim 24, wherein one of the open methods specifies a URL as a data source.

27. The system of claim 24, wherein one of the open methods specifies a media source created by the application.

28. The system of claim 24, wherein one of the open methods specifies an object that has an interface from which a media source object can be obtained.

29. The system of claim 24, wherein one of the open methods specifies an object from which a byte stream can be obtained.

30. The system of claim 24, wherein one of the open methods specifies a topology to be used.

31. The system of claim 24, wherein the open methods are selected from a group of open methods that:
specify a URL as a data source,
specify a media source created by the application,
specify an object that has an interface from which a media source object can be obtained,
specify an object from which a byte stream can be obtained, and
specify a topology to be used.

32. The system of claim 24, wherein the media engine is configured to provide methods to start a presentation, stop a presentation, and pause a presentation.

33. The system of claim 32, wherein the media engine is configured to generate and send an event to an application associated with each of said start, stop and pause methods.

34. The system of claim 24, wherein the media engine further comprises a plurality of information methods that can be used by the application to obtain information that pertains to the presentation.

35. The system of claim 34, wherein one of the information methods enables the application to be exposed to multiple capabilities of the media engine.

36. The system of claim 34, wherein one of the information methods enables the application to ascertain when the system's capabilities change.

37. The system of claim 34, wherein one of the information methods enables the application to obtain metadata associated with the presentation.

38. The system of claim 34, wherein one of the information methods enables the application to obtain metadata associated with the presentation, the metadata being obtained in the form of a property store that can be queried for the metadata.

39. The system of claim 34, wherein one of the information methods enables the application to ascertain a current destination.

40. The system of claim 34, wherein one of the information methods enables the application to ascertain statistics associated with the media engine.

41. The system of claim 34, wherein one of the information methods enables the application to ascertain a current state of the media engine.

42. The system of claim 34, wherein one of the information methods enables the application to retrieve a clock according to which the media engine is presenting.

43. The system of claim 34, wherein the information methods are selected from a group of information methods comprising methods that enable the application to: (1) be exposed to multiple capabilities of the media engine; (2) obtain metadata associated with the presentation; (3) ascertain a current destination; (4) ascertain statistics associated with the media engine; (5) ascertain a current state of the media engine; and (6) retrieve a clock according to which the media engine is presenting.

44. The system of claim 24, wherein the media engine is configured to generate a plurality of events associated with the presentation, the media engine being configured to send the events to the application.

45. The system of claim 44, wherein one event is associated with a new presentation that is to be presented.

46. The system of claim 44, wherein one event is associated with a completion of an open method.

47. The system of claim 44, wherein one event is associated with completion of an operation begun by calling a start method on the media engine.

48. The system of claim 44, wherein one event is associated with completion of an operation begun by calling a stop method on the media engine.

49. The system of claim 44, wherein one event is associated with completion of an operation begun by calling a pause method on the media engine.

50. The system of claim 44, wherein one event is associated with rendering of a last data sample from an active media source.

51. The system of claim 44, wherein one event is associated with completion of an operation begun by calling a close method on the media engine.

52. The system of claim 44, wherein one event is associated with a switch between presentations.

53. The system of claim 44, wherein one event is associated with a presentation destination change.

54. The system of claim 44, wherein one event is associated with a state change on the media engine.

55. The system of claim 44, wherein one event is associated with a change in a set of allowed operations on the media engine.

56. The system of claim 44, wherein one event is associated with a media rate change.

57. A system comprising:
first and second computing devices; and
a media engine distributed among and implemented in the first and second computing devices and configured to communicatively interact with an application of the second computing device to present a presentation, the media engine being configured to use a media session, the media engine and the media session configured to present the presentation on the second computing device, the first and second computing devices being remote from each other, the media engine implemented in the first computing device being configured to:
  use one or more media sources individual ones of which serving as a source of media content; and
  first partially resolve a topology that is to be utilized to present the presentation, and then cause a full topology to be resolved and activated,
  distribute the full topology to the second computing device, and
the media engine implemented in the second computing device being configured to use:
  one or more transforms linked to the full topology, communicatively linked with one or more media sources, and configured to operate on data received from the one or more media sources; and
  one or more media sinks configured to sink a media stream.

58. The system of claim 57, wherein the media engine exposes application program interfaces that are used by the application to interact directly with the media engine, and indirectly with components used by the media engine.

59. The system of claim 57 further comprising a destination associated with the media engine and configured to provide one or more media sinks.

60. The system of claim 57, wherein at least some components used by the media session are not visible to the application or media engine.

61. The system of claim 57, wherein the media session is configured to:
receive information from the media engine, said information being associated with (a) media content that is to be the subject of a presentation, and (b) a destination that is configured to provide one or more media sinks, and
cause the media content to be presented.

62. The system of claim 57, wherein the media session is configured to manage data flow from said one or more media sources to said one or more media sinks.

63. The system of claim 57, wherein the media session exposes one or more methods that enable the media engine to configure the media session for a presentation.

64. The system of claim 57, wherein the media session exposes one or more methods that enable the media engine to configure the media session for a presentation, wherein one method comprises a method through which a topology on the media session is initialized.

65. The system of claim 57, wherein the media session exposes one or more methods that enable the media engine to configure the media session for a presentation, wherein one method comprises a method through which one or more components can subscribe to receive notifications from a clock that is used to control the presentation.

66. The system of claim 57, wherein the media session provides methods for starting, stopping and pausing a presentation.

67. The system of claim 57, wherein the media session provides a preroll method that is used by the media engine to notify the media session to prepare for the start of a presentation.

68. The system of claim 57, wherein the media session further comprises a plurality of information methods that can be used by the media engine to obtain information from the media session.

69. The system of claim 57, wherein the media session further comprises a plurality of information methods that can be used by the media engine to obtain information from the media session, wherein one information method enables the media engine to ascertain a globally unique identifier that is associated with a particular implementation of a media session.

70. The system of claim 57, wherein the media session further comprises a plurality of information methods that can be used by the media engine to obtain information from the media session, wherein one information method enables the media engine to ascertain capabilities associated with the media session.

71. The system of claim 57, wherein the media session is further configured to generate a plurality of events associated with the presentation, the media session being configured to send the events to the media engine.

72. The system of claim 57, wherein the media session is further configured to generate a plurality of events associated with the presentation, the media session being configured to send the events to the media engine, wherein the media engine is configured to forward at least some of the events generated by the media session to the application.

73. The system of claim 57, wherein the media session is further configured to generate a plurality of events associated with the presentation, the media session being configured to send the events to the media engine, wherein one event comprises a session started event that is generated when a session is started.

74. The system of claim 57, wherein the media session is further configured to generate a plurality of events associated with the presentation, the media session being configured to send the events to the media engine, wherein one event comprises a session stopped event that is generated when a session is stopped.

75. The system of claim 57, wherein the media session is further configured to generate a plurality of events associated with the presentation, the media session being configured to send the events to the media engine, wherein one event comprises a session ended event that is generated with a session is ended.

76. The system of claim 57, wherein the media session is further configured to generate a plurality of events associated with the presentation, the media session being configured to send the events to the media engine, wherein one event comprises a session paused event that is generated when a session is paused.

77. The system of claim 57, wherein the media session is further configured to generate a plurality of events associated with the presentation, the media session being configured to send the events to the media engine, wherein one event comprises a rate change event that is generated when a media rate is changed.

78. The system of claim 57, wherein the media session is further configured to generate a plurality of events associated with the presentation, wherein the events are selected from a group of events comprising: (1) a session started event that is generated when a session is started; (2) a session stopped event that is generated when a session is stopped; (3) a session ended event that is generated with a session is ended; (4) a session paused event that is generated when a session is paused; (5) a rate change event that is generated when a media rate is changed.

79. The system of claim 57 further comprising a media processor used by the media session and using at least one of said media sources and at least one transform.

80. A system comprising:
first and second computing devices; and
a media engine distributed among and implemented in the first and second computing devices and configured to communicatively interact with an application of the second computing device to present a presentation, the media engine being configured to use a media session, the media engine and the media session configured to present the presentation on the second computing device, the first and second computing devices being remote from each other,
the media session being configured to use at least one media processor, one or more bit pumps communicatively linked with the media processor, and one or more media sinks communicatively linked with respective bit pumps,
the media processor being configured to use one or more media sources and one or more transforms communicatively linked with one or more media sources and configured to operate on data received from the one or more media sources,
the media engine implemented in the first computing device being configured to:
use the one or more media sources, individual ones of which serving as a source of media content; and
first partially resolve a topology that is to be utilized to present the presentation, and then cause a full topology to be resolved and activated,
distribute the full topology to the second computing device, and
the media engine implemented in the second computing device being configured to use:
the one or more transforms, which are linked to the full topology, communicatively linked with one or more media sources, and configured to operate on data received from the one or more media sources; and
the one or more media sinks, which are configured to sink a media stream.

81. The system of claim 80, wherein the one or more bit pumps are configured to pull data from the media processor.

82. The system of claim 80, wherein the one or more bit pumps are configured to pull data from the media processor and to push pulled data to one or more media sinks.

* * * * *